United States Patent
Satoh et al.

[11] Patent Number: 6,129,900
[45] Date of Patent: *Oct. 10, 2000

[54] PROCESS FOR THE SYNTHESIS OF DIAMOND

[75] Inventors: Shuichi Satoh; Hitoshi Sumiya; Kazuwo Tsuji; Yasushi Gouda, all of Itami, Japan

[73] Assignee: Sumitomo Electric Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/307,493

[22] PCT Filed: Feb. 14, 1992

[86] PCT No.: PCT/JP92/00149

§ 371 Date: Oct. 14, 1992

§ 102(e) Date: Oct. 14, 1992

[87] PCT Pub. No.: WO92/14542

PCT Pub. Date: Sep. 3, 1992

Related U.S. Application Data

[63] Continuation of application No. 07/949,478, Oct. 14, 1992, abandoned.

[30] Foreign Application Priority Data

| Feb. 15, 1991 | [JP] | Japan | 3-022240 |
| Mar. 14, 1991 | [JP] | Japan | 3-075622 |
| Aug. 29, 1991 | [JP] | Japan | 3-244924 |
| Sep. 24, 1991 | [JP] | Japan | 3-243135 |
| Nov. 18, 1991 | [JP] | Japan | 3-301813 |
| Nov. 19, 1991 | [JP] | Japan | 3-303197 |
| Nov. 26, 1991 | [JP] | Japan | 3-310618 |

[51] Int. Cl.⁷ ..................... B01J 3/06

[52] U.S. Cl. ............................................. 423/446

[58] Field of Search .................... 423/446, 264, 423/275; 117/49, 54, 62, 64

[56] References Cited

U.S. PATENT DOCUMENTS

| 4,287,168 | 9/1981 | Wentorf, Jr. et al. | 423/446 |
| 4,425,315 | 1/1984 | Tsuji et al. | 423/446 |
| 4,518,659 | 5/1985 | Gigl et al. | 423/446 |

FOREIGN PATENT DOCUMENTS

| 2-233511 | 9/1990 | Japan | 423/446 |
| 1541847 | 3/1979 | United Kingdom . | |

OTHER PUBLICATIONS

Patent Abstracts of Japan; vol. 13, No. 105 (C–575) Mar. 13, 1989 & JP–A–63278545 (Sumitomo Electric Ind. Ltd.) Nov. 16, 1988.

*Primary Examiner*—Steven P. Griffin
*Assistant Examiner*—Stuart L. Hendrickson
*Attorney, Agent, or Firm*—Wenderoth, Lind & Ponack, L.L.P.

[57] ABSTRACT

A colorless and transparent, substantially inclusion-free diamond crystal which can be applied to decorative uses and optical parts is synthesized by a process using a temperature gradient method in an ultra-high pressure apparatus. This process comprises using, as a solvent for the growth of the crystal, at least one metal selected from the group consisting of Fe, Co, Ni, Mn and Cr (at least two metals in the case of containing Fe) and as a nitrogen getter for the removal of nitrogen in the solvent, at least one metal selected from the group consisting of Al, Ti, Zr, Hf, V, Nb and Ta in a proportion of 0.5 to 7% by weight (at most 2% by weight when using only Al) to the solvent metal.

12 Claims, 8 Drawing Sheets

PROCESS FOR THE SYNTHESIS OF DIAMOND

This application is a continuation of now abandoned application, Ser. No. 07/949,478, filed Oct. 14, 1992.

TECHNICAL FIELD

This invention relates to a process for the synthesis of transparent diamond single crystal suitable for use as a material for decoration and optical parts, and more particularly, it is concerned with a process for the synthesis of diamond at a static high pressure and high temperature, specifically high purity, nitrogen-free, colorless and transparent diamond of IIa type.

TECHNICAL BACKGROUND

At the present time, commercially available diamond for decoration is a colorless and tranparent diamond with little internal defects is selected from those mined in South Africa or Soviet and thus marketed. Natural decorative diamond, among jewels, is on sale in the largest amounts. As an optical part using diamond, there are IR anvil cells, laser window materials, etc. and in any case, a diamond having no absorption of light in the infrared range, called IIa type, is selected from natural gem stones and used. However, the mining amount of color-less and transparent gem stones is very small, thus resulting in problems on stable supply and price.

That is, natural diamond has the disadvantage that a transparent and colorless rough stone is mined in a small amount and is thus expensive. Above all, the output of a rough stone having no absorption of nitrogen in the infrared range is so little as represented by, for example, an output of the above described IIa type of 1–2% based on the whole rough stones, thue resulting in a problem on supply thereof. In particular, a large-sized window material of 8 mm in diameter is hardly available.

Transparent and colorless diamond has first been synthesized in artificial manner in the 1970s. This synthesis was carried out by the temperature gradient method using a Fe-3~5 wt % Al alloy as a solvent metal, thus obtaining several diamond crystals with 0.7~1.0 carat in the form of brilliant. The resulting diamond was estimated as G to H by the color scale of natural gem (GIA Standard: standard of gem provided by the American Gem Institute)(U.S. Pat. No. 4,073,380). However, such synthetic diamond has not been marketed because the synthesizing cost is higher than the price of diamond as natural gem.

Artificial diamond is ordinarily colord yellow because during synthesis at an ultra-high pressure and high temperature, nitrogen in a solvent is taken in the crystal lattice, but colorless and transparent diamond can be obtained by adding a nitrogen getter to the solvent. As this nitrogen getter, Al is well known as disclosed in, for example, "The Journal of Physical Chemistry", Vol. 75, No. 12 (1971), p 1838. Specifically, U.S. Pat. No. 4,034,066 discloses that colorless and transparent diamond single crystal of gem grade can be obtained by adding 3 to 5% by weight of Al to a Fe solvent.

As an example of other nitrogen getters than Al, it has been reported in "Muki-zaishitsu Kenkyujo Hokoku (Report of Inorganic Material Institute)", No. 39 (1984), page 16–19 that nitrogen in the crystal is removed by adding Ti or Zr to a solvent metal.

However, combinations capable of producing colorless diamond are only ① Fe—Zr, ② (Fe—Ni) alloy-Zr and ③ (Ni—Mn) alloy-Zr and no such colorless diamond can be formed with other combinations. In the above described combinations of ① to ③, only the combination ① of Fe—Zr is capable of giving one having no absdorption in a wavelength range of at most 500 nm. The presence of the absorption in the wavelength range of at most 500 nm means that nitrogen atoms are not completely removed.

Furthermore, it has already been reported by H. M. Strong and P. H. Cherenko in "J. Chem. Phys. 75 P 1938 (1971)" that in order to grow a colorless crystal without adding such a nitrogen getter, the growth rate should be reduced to at most 60% of the case of growing a yellow crystal of Ib type.

In particular, synthetic colorless and transparent diamond has not been produced on a commercial scale, because of higher synthesis cost thereof than that of natural decorative diamond. The reason therefor is that not only an expensive and special apparatus is required for the synthesis of such diamond, but also in order to obtain a good quality crystal, it is required to largely lower the growth rate, since in the case of adding a nitrogen getter such as Al to a solvent, the solvent is taken or included in the crystal (this phenomenon will hereinafter be referred to as "inclusion") with the increase of the amount of the nitrogen getter added, thus resulting in an inferior crystal. When using Ti or Zr as a nitrogen getter, in particular, carbides such as TiC or ZrC, formed in the solvent during synthesis, are taken in the crystal and accordingly, it is difficult to obtain a complete crystal.

When using Al as a nitrogen getter and uniformly dissolving it in the solvent metal, it is found necessary in order to synthesize colorless and transparent diamond, according to the inventors' experimental results, to add the nitrogen getter in a proportion of at least 4% by weight (about 12% by volume) to the solvent and in this case, the growth rate should be at least 1 mg/hr so as to effect the crystal growth without inclusion thereof. At this growth rate, however, a synthesis time of 200 hours or more is required, for example, for obtaining a crystal of 1 carat (200 mg), resulting in a large production cost.

When adding another nitrogen getter such as Ti or Zr having a larger reactivity with nitrogen than Al uniformly to the solvent, a colorless and transparent crystal can be obtained even in an amount of 2% by volume and the growth rate can largely be decreased, but large amounts of carbides such as TiC or ZrC are included in the crystal and a good quality crystal can hardly be obtained.

It is an object of the present invention to provide a process for producing an artificial synthetic diamond, which is colorless and transparent and has no absorption of nitrogen in the infrared range, and which can be applied to decorative articles and optical articles, in economical and stable manner, whereby the above described disadvantages and problems of the prior art can be solved.

It is another object of the present invention to provide a method for synthesizing a diamond crystal of IIa type, substantially free from impurities, at a static high pressure without lowering the growth rate, i.e. at a growth rate of about 2 times of the prior art in view of the above described problems.

It is a further object of the present invention to provide a process for producing an artificial synthetic diamond, which is colorless and transparent and substantially free from inclusions, in economical and stable manner, whereby the above described problems of the prior art can be solved and use of the artificial synthetic diamond for decorative and optical appliances is rendered possible.

It is a still further object of the present invention to provide a new process for the production of a good quality diamond single crystal which is colorless and transparent, and free from inclusions by adding a nitrogen getter.

DISCLOSURE OF INVENTION

The present invention provides a process for the synthesis of diamond, which comprises, in the synthesis of diamond crystal by the temperature gradient method, using, as a solvent for the growth of the crystal, at least one metal selected from the group consisting of Fe, Co, Ni, Mn and Cr (nevertheless, at least two metals are selected in the case of containing Fe) and as a nitrogen getter for the removal of nitrogen in the solvent, at least one metal selected from the group consisting of Al, Ti, Zr, Hf, V, Nb and Ta in a proportion of 0.5 to 7% by weight (nevertheless, at most 2% by weight in the case of using only Al) to the solvent metal.

The features of the present invention can be summarized below:

(a) Removal of Nitrogen

At least one metal selected from the group consisting of Fe, Co, Ni, Mn and Cr is used as a solvent for the synthesis of diamond. In order to prevent a seed crystal from dissolving in the solvent, it is preferable to previously add carbon with a nearly saturated concentration.

At least one metal selected from the group consisting of Al, Ti, Zr, Hf, V, Nb and Ta, capable of forming nitrides in a solvent, is added in the specified amount so as to remove nitrogen causing coloration of a crystal in yellow.

(b) Prevention of Contamination with Carbides, Oxides and Nitrides

Contamination of a crystal with carbides, oxides and nitrides is prevented by floating or precipitating according to the following two methods:

① At least one low viscosity element of Al, Sn, In, Ga, Ag, Cu, Cs, Pb, Sb and Zn is added to a solvent to promote the rate of floating or precipitating of the above described carbides, etc. and the carbides, etc. are thus allowed to float upward or precipitate downward before they are taken and included in the crystal.

The addition of the low viscosity elements is generally carried out by the following three methods:

i) An intermetallic compound of a nitrogen getter element and low viscosity element is prepared and uniformly dispersed in the form of a powder or fragment in the solvent.

ii) A sheet of a nitrogen getter element and a sheet of a low viscosity element are stacked.

iii) A nitrogen getter element and low viscosity element in the form of elements or alloys are mixed with or dissolved in the solvent.

Above all, the method i) is more preferable. The additive amount of the low viscosity element is preferably 0.5 to 3 weight % based on the solvent.

② A nitrogen getter metal or an alloy thereof with a solvent metal, in the form of a powder or fragments, preferably having a diameter of 10 μm to 1 mm, is uniformly mixed with the solvent. In this size range, even if the added metal is carburized, nitrided or oxidized, the floating or precipitating speed of the carbide, nitride or oxide is so large that these materials are not colloidal and are floated or precipitated before inclusion in the crystal.

(c) Method of Making Crystal Colorless

According to the prior art method, a micro amount of nitrogen cannot be removed and a crystal of G to H grade is only obtained. Thus, the present invention aims at further making colorless the crystal by the following two methods:

① Since the residual nitrogen forms a deep energy level N-type semiconductor, at least one of B, Ga, Be, In and Li, giving a P-type semiconductor, is added to the crystal to form AD pairs and electrically neutralized. The additive amount thereof is preferably in the range of 0.2 ppm to 2 weight %.

② At least one of elements capable of increasing the acitivity of a nitrogen getter, such as Pb, In, Cd and Bi, is added to form nitrides and to promote removal of nitrogen.

(d) Synthesis of Good Quality Crystal

When the above described nitrogen getter is added, the diffusion rate and saturated concentration of carbon are lowered and carbon required for the growth of the crystal, to be supplied, is lacking. Thus, non-grown areas on the surface of the crystal are enlarged and the solvent metal tends to be included in the crystal. In order to prevent this phenomenon, at least one of Sn, P and S, capable of increasing the activity of carbon, is added, preferably in a proportion of 0.1 to 10% by weight.

BEST EMBODIMENT FOR PRACTICING THE INVENTION

Figure 1:
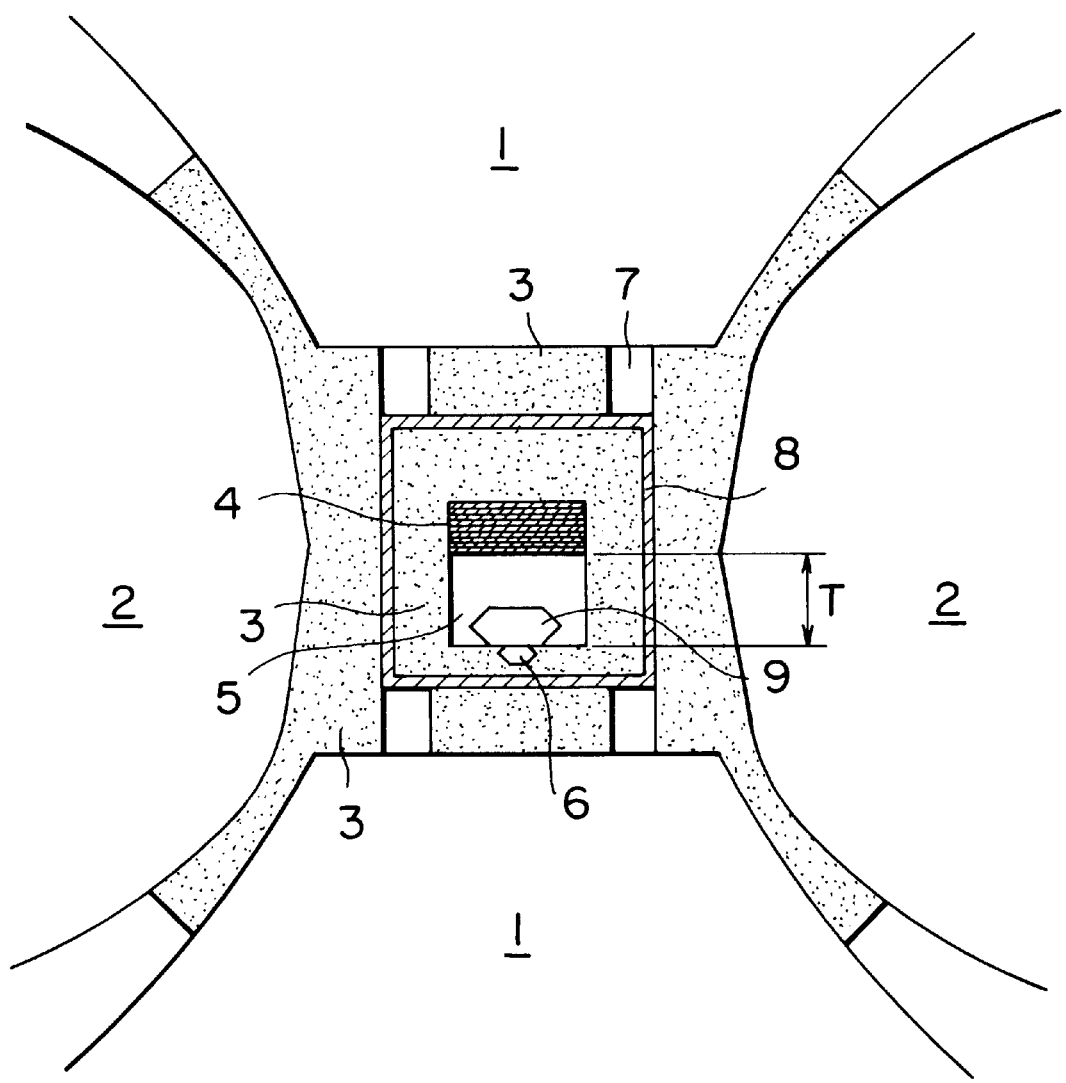
FIG. 1 is a cross-sectional view of an ultra-high pressure cell used for the synthesis of a single crystal in embodiments of the present invention.

The first embodiment of the present invention consists in obtaining diamond having no absorption of nitrogen in the infrared range by a process for the synthesis of diamond, which comprises, in the synthesis of diamond by the temperature gradient method, using as a solvent an alloy of xFe-yCo-zAl system in which x, y and z are in the range of 20>y≦90 and z≦2 by weight %.

In addition, diamond with a higher transparency can be obtained by the use of the above described alloy of xFe-yCo-zAl to which at least one of B, Ga, Be, In and Li is added in a very small amount. More preferably, the amount of at least one of B, Ga, Be, In and Li to be added is in the range of 0.2 ppm to 2% by weight.

In the prior art method of synthesizing colorless and transparent diamond, as disclosed in U.S. Pat. No. 4,073,380, Fe—Al type alloys having an Al content of 3% by weight or more, such as Fe-3 wt % Al and Fe-5 wt % Al, are used as a solvent. This method meets with the problem that the growth rate is so low as represented by, for example, 206 mg in 160 hours and 140 mg in 190 hours and a considerably larger cost is required for this synthesis because of using an expensive ultra-high pressure apparatus. According to our studies, it is found that when using the solvent of Fe—Al type, inclusion of the solvent takes place at an average growth rate of exceeding 1 mg/hr, resulting in marked deterioration of the crystal quality, and when the amount of Al to be added is decreased, the critial growth rate capable of giving a good quality single crystal is increased, but the amount of nitrogen in the crystal is not decreased, thus hardly obtaining a colorless crystal.

Under the situation, the inventors have made various stuides to solve the above described problems and the following means ①, ② and ③ are effective for obtaining a synthetic diamond of IIa type having no absorption of nitrogen in the infrared range:

① using an alloy of Fe—Co—Al type as a solvent,

② decreasing the amount of Al in the alloy of Fe—Co—Al type to 2% by weight or less to decrease the inclusion of the metallic solvent and ③ adding a micro amount of at least one element selected from the group consisting of B, Ga, Be, In and Li to electrically neutralize a micro amount of nitrogen remaining in the crystal, thereby rendering colorless the crystal through this neutralization action.

The functions and effects of the first embodiment of the present invention will be illustrated in detail:

Functions of Fe—Co—Al Alloys

Generally, diamond synthesized at an ultra-high pressure colors yellow. This is probaly due to that nitrogen atoms supplied from a solvent, raw materials and compressible media are taken in the crystal during growth thereof to give an single dispersion type (Ib type) and form an impurity donor energy level.

Removal of the nitrogen atoms is preferably carried out by adding a metal such as Al and allowing it to function as a nitrogen getter. That is, the addition of Al results in formation of AlN and removal of the nitrogen atoms as the nitride.

On the other hand, however, the addition of Al increases inclusion of the metallic solvent in the crystal. According to the first embodiment of the present invention, it is found that the use of a solvent of Fe—Co—Al type is effective for solving this problem, since as compared with the solvent of Fe—Al type of the prior art, the diffusion rate of raw material carbon in the solvent is higher and the raw material carbon sufficiently extends to round the crystal during growth, so that inclusion of the solvent metal does not readily take place.

As other solvent metals, Fe, Ni, Mn, Cr, Ti, V, Zr, etc. are taken into consideration, but alloys of Al with several metals selected from these metals are unfavorably compared with the solvent of Fe—Co—Al type with respect to the diffusion rate of carbon and in the former case, more inclusion of the solvent is caused.

In the case of a solvent of Fe—Ni—Al alloy, the diffusion rate of carbon is considerably large, next to the solvent of Fe—Co—Al alloy, so that inclusion of the solvent is simialarly suppressed, but there arises a drawback that the amount of removing nitrogen atoms present in the crystal is smaller for the same additive amount of Al. From the above described examination results, it is concluded that the solvent of Fe—Co—Al type is most suitable.

Furthermore, it is found desirable that when the composition ratio by weight of Fe—Co—Al is respectively represented by x, y and z, y is in the range of 20≦y≦90, since if y is less than 20 weight %, the synthetic temperature is high and inclusion of the solvent is increased, while if more than 90 weight %, the synthetic temperature is high and the grade of color is degraded. It is also found desirable that the ratio of x/(x+y+z) is in the range of 0.1 to 0.8, since if the ratio is less than 0.1, the synthetic temperature is high and the grade of color is degraded, while if more than 0.8, the synthetic temperature is high and inclusion of the solvent is increased.

Specification of Amount of Al in Alloy of Fe—Co—Al System In at Most 2% by Weight The amount of metallic impurities contained in the crystal is increased with the increase of that of Al. Now it is found that if the amount of Al added is less than 2% by weight, preferably 0.5 to 2% by weight, there can be obtained a crystal with less inclusion at a growth rate substantially same as in the case of not adding Al, but if more than 2% by weight, the incluion is increased. In addition, it is confirmed that the single crystal synthesized in the solvent of according to the present invention has no absorption of nitrogen in the infrared range and is most suitable for use as a material for infrared optics. When the diamond according to the present invention is subject to brilliant cut, decorative diamond of J to K grade can be obtained.

Actions and Effects by Addition of B, Ga, In, Li and Be

When using the diamond of the present invention as a decorative one, this corresponds to a diamond of J to G grade, being somewhat yellowish. It is found that in order to obtain a colorless and transparent crystal of F or higher grade, having less inclusion, at a growth rate substantially same as in the case of not adding Al, i.e. as in the method of the present invention, it is most effective to add to the crystal a micro amount of at least one metallic element selected from the group consisting of B, Ga, In, Li, Be and the like, which are considered to give p-type semiconductive property upon incorporation in the crystal, thereby electrically neutralizing. During the same time, it is desirable that the amount of the metallic element is within 0.2 ppm to 2% by weight, preferably 25 ppm to 2% by weight, since if less than 0.2 ppm, the effect of rendering colorless and transparent is decreased, while if more than 2%, other coloration or inclusion appears in the crystal.

As explained above, the following benefits can be obtained by the use of a solvent of xFe-yCo-zAl (x, y, z: weight %, 20≦y≦90 and z≦2) according to the present invention:

(a) the growth speed reaches 2.5 times as fast as in the case of using solvents of Fe-3~5 wt % Al type in the prior art and (b) the metallic inclusion (metal contents) in a crystal is decreased to ⅓ of that of the prior art, that is, about 0.3% by weight, while it amounts to 0.9% by weight in the prior art.

Thus, a single crystal for an infrared optical part and a good quality diamond single crystal for decoration, of J to K class, having no absorption of nitrogen, can be supplied in economical manner.

In addition, a micro amount of a metal such as B, Ga, Be, Li, In, etc. is added to the above described solvent, whereby a good quality diamond single crystal for decoration, with a high transparency of F to G class, can economically be produced.

The second embodiment of the present invention is a process for the synthesis of diamond of IIa type, comprising adding a material to be a nitrogen getter to a sample in a synthesis chamber and subjecting the sample to growth of diamond crystal at a static high pressure and high temperature, characterized in that a material capable of increasing the activity of the nitrogen getter is added in a required quantity.

In this embodiment, in order to achieve the above described objects of the present invention, the amount of Al to be added to a solvent is decreased to such an extent that the problem does not arise that the solvent metal itself tends to be included in a crystal and a required amount of a material capable of increasing the acitvity of Al is added so as to make up for the decreased effect of removing nitrogen and to give an effect more than the decreased one to Al in the decreased amount.

Figure 3:
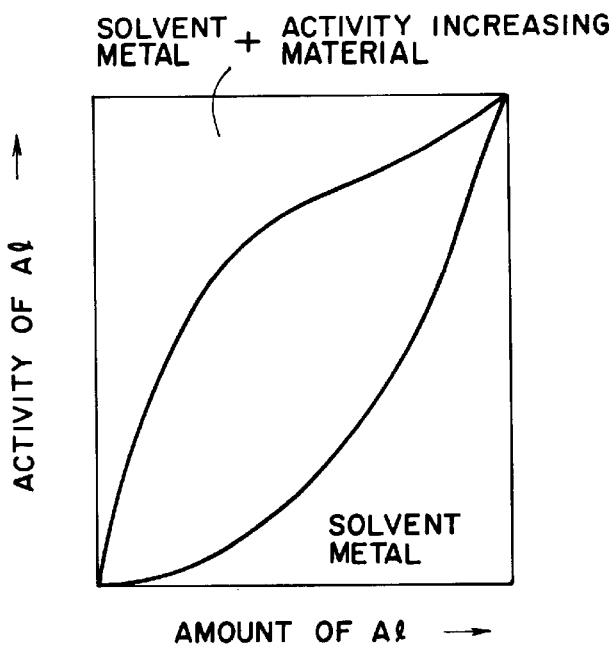
FIG. 3 is a graph showing the relationship between the amount of Al and its activity when an activity-increasing material is added to a solvent metal.

FIG. 3 is a chart showing increase of the activity of Al in the case of only a solvent metal and in the case of adding an activity-increasing material to the solvent metal. As the material for increasing the acitivity of a nitrogen getter such as Al, there are used Pb, In, Bi, Cd and the like and the required amount thereof is generally in the range of 0.3 to 4 weight %, since if it is less than 0.3 weight %, the addition effect is little, while if more than 4 weight %, inclusion of the solvent metal is increased.

Figure 4:
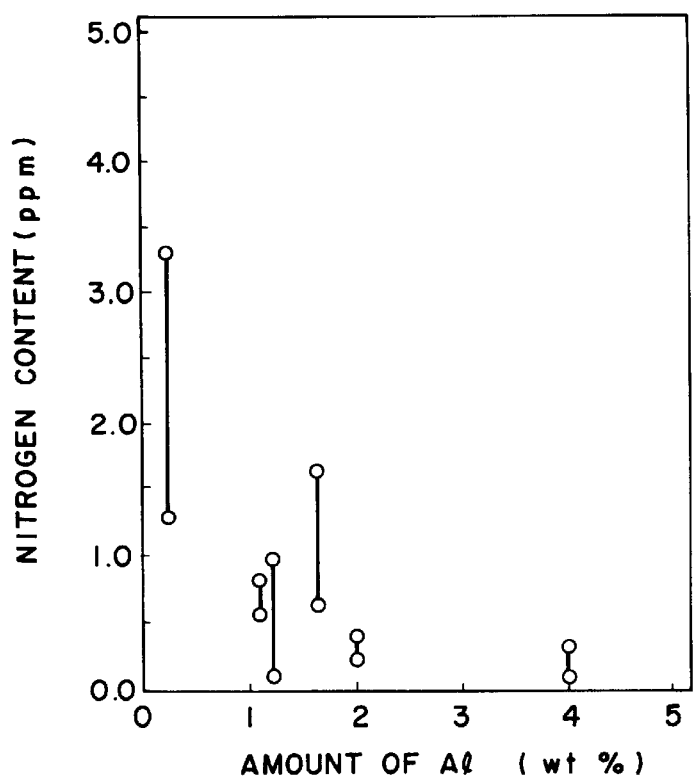
FIG. 4 is a graph showing the relationship between the amount of Al added to a solvent metal and the amount of nitrogen contained in diamond crystal.

FIG. 4 is a graph showing the relationship between the amount of Al added to a solvent metal and the amount of nitrogen contained in diamond crystal. The amount of nitrogen contained in diamond crystal is estimated by a wave form of ESR (Electron Spin Resonance). From FIG. 4, it is apparent that the amount of nitrogen contained in diamond crystal is decreased with the increase of Al. When 2 weight % of Al is added, the resulting diamond is colored light yellow, while the addition of up to 4 weight % of Al results in substantially colorless diamond.

Figure 5:
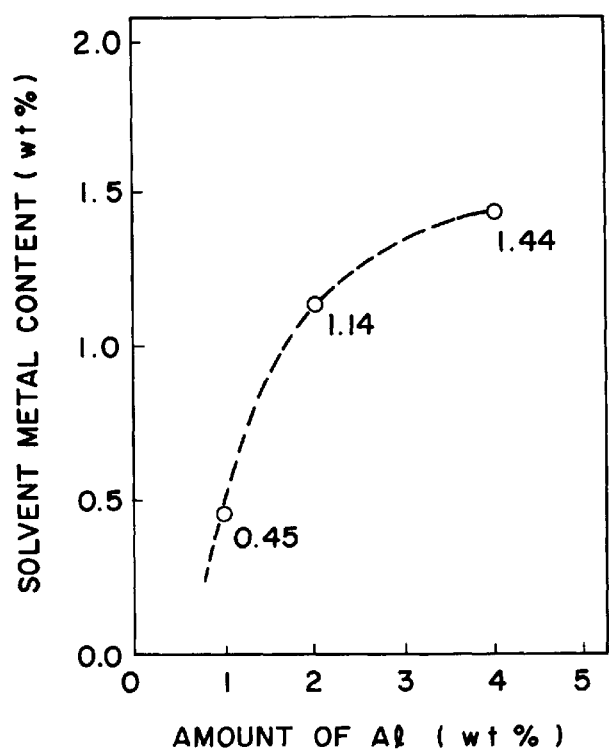
FIG. 5 is a graph showing the relationship between the amount of Al added to a solvent metal and the amount of a metal included in diamond crystal.

FIG. 5 is a graph showing the relationship between the amount of Al added to a solvent metal and the amount of a solvent metal included in diamond crystal (content of solvent metal). The content of the solvent metal in the crystal is estimated by the use of a magnetic balance.

As is evident from FIG. 5, the content of a solvent metal is increased with the increase of Al. When a crystal (Ib type) is grown without adding Al to the solvent, the content of the solvent metal is 0.25 to 0.50% by weight, which is less than when adding Al.

When a crystal of IIa type (gemstone), with a small amount of nitrogen, is applied to optical materials, ultra-precision cutting tools, surgical knives, etc., it is required to prevent it from inclusion of metal impurities and to eliminate included sites or vicinities thereof in the gemstone. Considering productivity, the metal content should preferably be reduced to at most 0.5% by weight and to this end, addition of Al to a solvent metal should be suppressed to at most 1% by weight.

The inventors have made studies on the mechanism of removing nitrogen by Al so as to find a method for effectively removing nitrogen from a crystal by Al in a decreased quantity, e.g. about 1% by weight. Consequently, it is found that an equilibrium relationship exists between the amount of Al added and the amount of nitrogen in the crystal and N is removed as AlN, that is, according to the reaction of Al+N→AlN with high possibility. If nitrogen is removed by the reaction as described above, it is considered effective to increase the activity of Al as a method of forwarding this reaction to the right without changing the absolute quantity of Al. That is, this method is a trial of raising only the activity without changing the absolute quantity by adding a material capable of increasing the activity of Al to the solvent.

Figure 6:
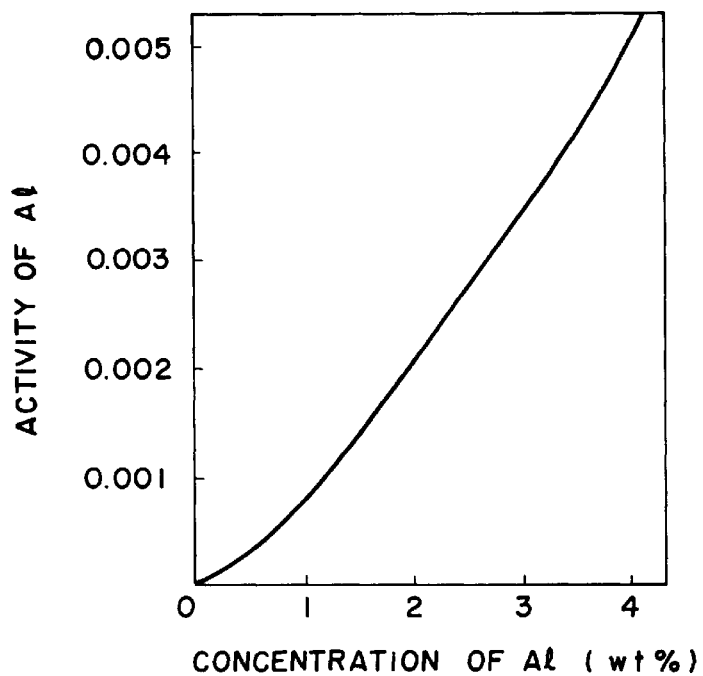
FIG. 6 is a graph showing the relationship between the concentration of Al in a solvent metal and the activity of Al.

For example, the relationship between the activity of Al and the concentration (weight %) of Al in a solvent having a composition of Fe-40% Co-1% Al is shown in FIG. 6. It is apparent from FIG. 6 that when 4% by weight of Al is added, the activity is 0.005, the crystal being substantially colorless but having large contents of impurities. Since the activity of Al is about 0.001 when 1% by weight of Al is added (the crystal having less impurities but being colored light yellow), it is only necessary to add such a material that the same activity (0.005) is given as when 4% by weight of Al is added. There are a number of materials capable of raising the activity of Al, but above all, Pb, In, Bi and Cd are preferably used. In Table 1 are shown, for example, activities of Al when about 5% by weight of Al is added to various elements, which are calculated from the data of "Selected Values of the Thermodynamic Properties of Binary Alloys; American Society For Metals".

TABLE 1

| Solvent Element | Activity of Al | Solvent Element | Activity of Al |
|---|---|---|---|
| Au | 0.0008 | In | 0.727 |
| Be | 0.26 | Mg | 0.052 |
| Bi | 0.915 | Ni | 0.0000031 |
| Cd | 0.952 | Pb | 0.988 |
| Cu | 0.001 | Si | 0.473 |
| Fe | 0.01 | Sn | 0.473 |
| Ga | 0.113 | V | 0.14 |
| Ge | 0.026 | Zn | 0.184 |

When predetermined amounts of these materials are added to the solvent to increase the activity of Al, the reaction of forming AlN is accelerated, inclusion of nitrogen in the crystal is decreased, even addition of 1% by weight of Al results in a colorless crystal and it is thus rendered possible to synthesize high purity diamond whose metal content is at most 0.5% by weight. The diamond of IIa type synthesized by this method of the present invention is suitable for decorative uses, infrared optical parts, ultraviolet to visible optical parts and diamond semiconductor substrates.

According to this embodiment, in the synthesis of diamond at a static high pressure, in particular, in the synthesis of high purity diamond of IIa type, which is substantially free from nitrogen and colorless and transparent, a material capable of increasing the activity of Al, as a nitrogen getter, is added and thus, nitrogen is effectively removed by such a small amount of Al that bad influences due to the addition of Al, e.g. inclusion of the metal do not appear. Therefore, according to the process of the present invention, diamond of IIa type can be synthesized at a growth rate of about 2 times as higher as in the prior art.

In the third embodiment of the present invention, there is provided a process for the synthesis of diamond of IIa type, which comprises floating upward or precipitating downward nitrides, carbides or oxides formed by addition of a nitrogen getter to remove nitrogen.

Figure 8:
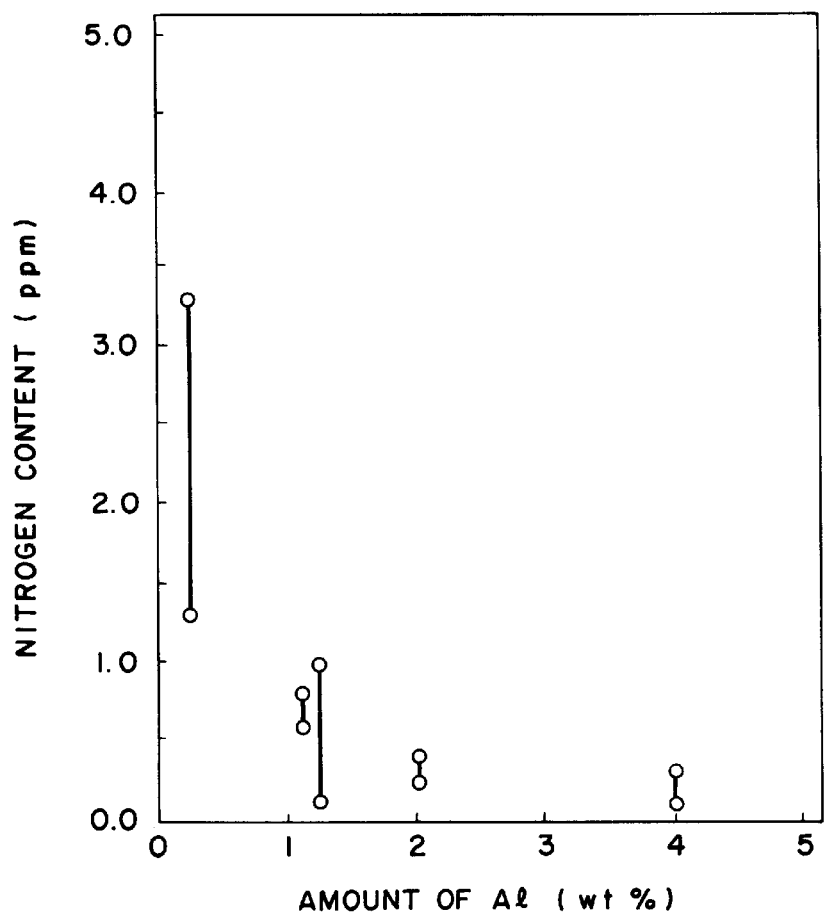
FIG. 8 is a graph showing the relationship between the amount of Al added to a solvent metal, as a nitrogen getter, and the amount of nitrogen contained in diamond crystal in the prior art method.
Figure 9:
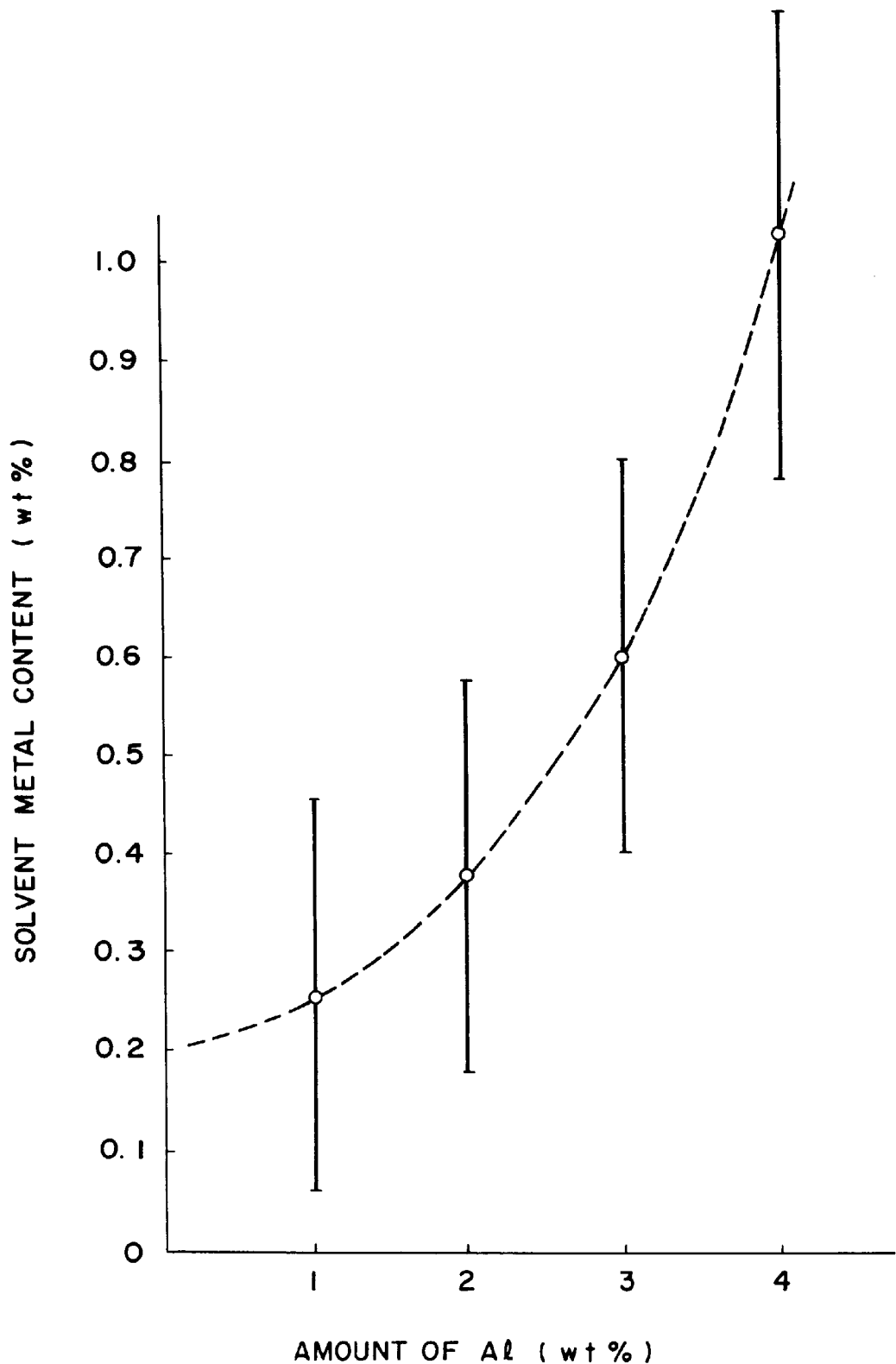
FIG. 9 is a graph showing the relationship between the amount of Al added to a solvent metal and the amount of the solvent metal in the crystal in the prior art method.

In the prior art method, as described above, it has mainly been employed to add Al to a solvent. In this case, the relationship between the amount of Al added to the solvent and the concentration of nitrogen in a crystal (nitrogen content) is shown in FIG. 8 and the relationship between the amount of Al added to the solvent and the amount of inclusions (solvent metal content, included quantity) is shown in FIG. 9. However, there arises the following problems:

① When the additive amount of Al is increased, the nitrogen concentration is decreased, but the inclusion is increased.

② For the synthesis of a good quality single crystal with less inclusion, the growth rate must be lowered.

③ Excessive removal of nitrogen results in coloration of a crystal in blue due to slightly retained boron (B) in the solvent.

On the other hand, when some elements functioning as a nitrogen getter but forming the corresponding carbides, etc., such as Ti or Zr, are added, the thus formed carbides, etc. are included in the crystal and a good quality crystal is hardly obtained.

In order to solve the above described problems, the following means are employed in this embodiment:

① At least one element selected from the group consisting of Ti, Zr, Hf, V, Nb and Ta is chosen and added to a solvent as a nitrogen getter. These elements tend to form borides and thus have an effect of removing blue.

② In order to prevent the carbides, etc. from being included in the crystal, a low viscosity element such as Al, Sn, In, Ga, Ag, Cu, Cs, Pb, Sb and Zn is added individually or in combination to increase the floating or precipitating rate of the carbides, etc. and the carbides, etc. are allowed to float upward or precipitate downward before they are included in the crystal.

(1) Functions of Ti, Zr, Hf, V, Nb and Ta as Nitrogen Getter

These elements, individually or in combination, form stable nitrides and function as a nitrogen getter. During the same time, when one of these elements is designated as A, nitrogen is removed by the following reaction formula:

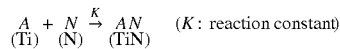

$\underset{(Ti)}{A} + \underset{(N)}{N} \overset{K}{\rightarrow} \underset{(TiN)}{AN}$  (K: reaction constant)

Ordinarily, Fe, Co, Ni, Mn or Cr has been used as a solvent for the synthesis of diamond. In the above described reaction formula, the effect of removing nitrogen is larger when the reaction constant is larger. The reaction constant K, depending on the variety of a solvent element, is larger in a Fe solvent, but smaller in a Ni solvent. Therefore, when synthesis of diamond is carried out in a Fe solvent, nitrogen can readily be removed, but in the same solvent, the diffuiosn rate of carbon is so low that short supply of carbon tends to take place and no good quality crystal cannot be obtained at a higher growth rate. On the other hand, a solvent capable of giving a high carbon diffusion rate is Co, so an alloy solvent of Fe and Co is preferably used for obtaining a good quality crystal.

A small amount of boron (e.g. several ppm) is ordinarily contained in the above described solvent metal and about 1/10 of the solvent concentration is taken in the crystal to give a concentration of 0.1 to 0.6 ppm. If the nitrogen-removing effect of a nitrogen getter is excessively large, the nitrogen electrically compensated with boron in the solvent is not contained in the crystal and conversion of from transparent to blueish takes place.

Ti, Zr, Hf, V, Nb and Ta tend to form borides and thus function as a boron getter to reduce blue color.

(2) Effects of Adding Low Viscosity Metal Elements such as Al, Sn, etc.

Ti, Zr, Hf, V, Nb and Ta form stable nitrides and thus function as an effective getter for removing nitrogen in the solvent. However, these metals simultaneously react with carbon and oxygen dissolved in the solvent to form carbides and oxides in large amounts. The carbides, nitrides and oxides are included in the crystal to degrade the quality of the crystal. The carbides, nitrides and oxides act as nuclei so that the solvent metal tends to be included in the crystal. Accordingly, it is important to remove the carbides, nitrides and oxides before growth of the crystal. Since the getter element, carbon, nitrogen and oxygen are uniformly dispersed in the solvent, the resulting carbides, nitrides and oxides are in the form of fine grains. These fine carbides, nitrides and oxides are not floated nor precipitated in a short time even if there is a density difference from that of the solvent.

For the purpose of floating upward or precipitating downward the carbides, nitrides and oxides in a short time and not suspending them during crystal growth, it is effective to lower the viscosity of the solvent.

Generally, the settling (floating) rate of colloidal and spherical fine grains are represented by the following formula:

$$u = \frac{2}{9} \frac{r^2}{\eta} (\rho - \rho_0) g$$

u: settling (floating) rate r: radius of grain

η: viscosity of solvent

ρ: density of grain $\rho_0$: density of solvent g: gravitational acceleration

Therefore, the settling (or floating) rate of the solvent is theoretically lowered in inverse proportion to the viscosity of the solvent so in order to increase the settling (floating) rate, it is effective to lower the viscosity of the solvent.

The amount of the metal added to lower the viscosity is generally 0.5 to 3% by weight, since if less than 0.5% by weight, its effect is little, while if more than 3% by weight, inclusion of the solvent metal is increased and the rate of crystal growth is lowered.

Addition of a low viscosity metal is preferably carried out by the use of an intermetallic compound of the low viscosity metal with a nitrogen getter metal, whereby no carbide is formed and a good quality crystal can be obtained.

As the intermetallic compound, for example, there are used Sn—Ti type intermetallic compounds such as $Sn_5Ti_6$, $Sn_3Ti_5$, $SnTi_2$ $SnTi_3$ and the like, Sn—Zr type intermetallic compounds such as $SnZr$, $Sn_2Zr$, $SnZr_3$ and the like, Sn—V type intermetallic compounds such as $SnV_3$ and the like, Sn—Nb type intermetallic compounds such as SnNb and the like, Sn—Hf type intermetallic compounds and Sn—Ta type intermetallic compounds. In particular, addition of $SnTi_3$ or $Sn_5Ti_6$ is more effective. In this case, TiC does not exist isolated and formation itself of TiC hardly takes place. Even if a Sn—Ti intermetallic compound is decomposed to form TiC, Sn exists near Ti and accordingly, TiC is readily diffused in a solvent. Consequently, a good quality crystal can be obtained in considerably easy manner.

Figure 11:
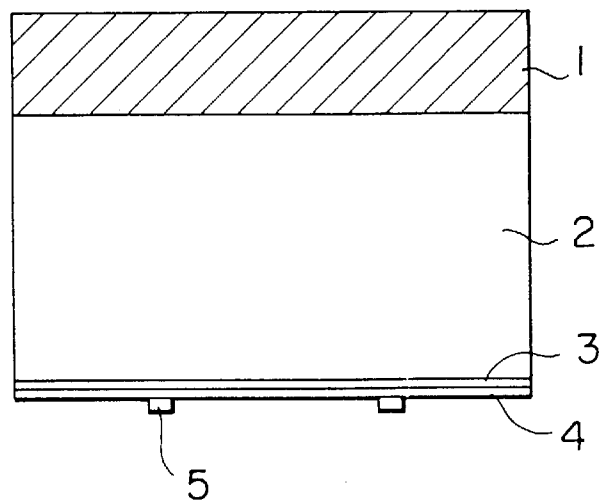
FIG. 11 is a schematic view of a construction of a sample chamber in one embodiment of the present invention.

Another method of adding a low viscosity compound comprises stacking a nitrogen getter metal sheet and a low viscosity metal sheet, as shown in FIG. 11. According to this embodiment of a process for the synthesis of diamond single crystal, a nitrogen getter is added or disposed to a solvent in the vicinity of a seed crystal, so that the nitrogen removal efficiency is increased, nitrogen is sufficiently removed even by addition of a small amount of a nitrogen getter and inclusion of impurities hardly takes place. Since the low viscosity metal is disposed on the seed crystal, moreover, the concentration of carbon just before incorporated in the crystal is increased, inclusion of the solvent can be prevented and in addition, remaining of TiC or ZrC in the crystal can also be prevented. Thus, it is possible to synthesize a colorless, transparent and inclusion-free diamond crystal at a high growth rate.

As a method of increasing the floating or precipitating rate of the carbides, etc., the grain diameter of a nitrogen getter metal is increased and uniformly dispersed. In the foregoing formula, the floating rate is proportional to the square of the grain diameter. If the grain diameter is smaller than 10 $\mu$m in this case, the floating rate of the carbides, etc. is so small that the carbides, etc. are included in the crystal, while if larger than 1 mm, the reaction of the nitrogen getter with nitrogen is decreased so that functioning as the nitrogen getter is lowered.

Al, In, Ga, etc. are elements tending to simultaneously form nitrides. Accordingly, nitrogen can be removed by adding these elements. In this case, further addition of Ti, Zr, Hf, etc. results in less inclusion of the solvent than when adding only the metals of Al, In, Ga, etc. When Al alone is added as a nitrogen getter, for example, a good quality crystal can be obtained in an additive amount of up to 2 weight %, which gives an estimation of VS or SI grade for the clarity of brilliant cut of this crystal. When Al and Ti are simultaneously added, the same result as described above can be obtained even when adding 3 weight % of Al. This is probably due to the fact that a nitride consisting of Ti, Al and N is formed.

A method and apparatus for synthesizing diamond single crystal by the temperature gradient method using a seed diamond are described in U.S. Pat. No. 4,034,066 specification and drawings. The outline thereof will be illustrated for the practice of the present invention.

Figure 10:
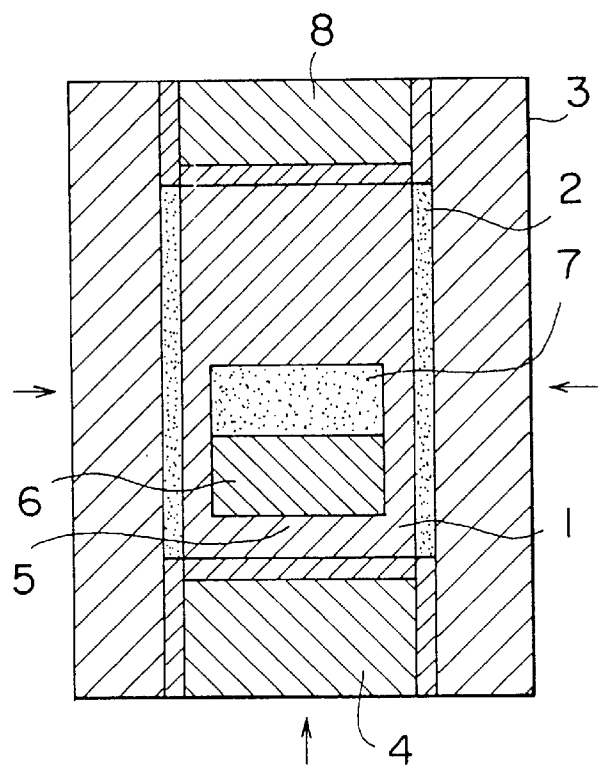
FIG. 10 is a schematic view of a reactor for practicing the present invention.

As shown in FIG. 10, within a pyrophillite cylinder 3 there is concentrically positioned a graphite tube heater 2, within which there are disposed a pyrophillite 1 and a diamond seed 5. On the diamond seed 5 are located a solvent metal 6 and further a carbon source 7, the lower part and upper part of which are filled with plugs 4 and 8. The plugs 4 and 8 and the pyrophillite cylinder 3 are pressure media made according to a same standard.

Diamond is synthesized by compressing the above described reaction vessel arranged in a hollow of a die consisting of cemented carbide at a predetermined pressure using the die consisting of cemented carbide and a pair of punches located above and below the reaction vessel, so as to be adapted to the hollow of the die, although not shown, passing electric current through the heater 2 to heat the reaction vessel and applying a pressure by the punches. Upon heating, the carbon source is dissolved in the metal solvent and crystal growth takes place on the seed crystal through a temperature gradient (20 to 30° C.).

During the same time, the commonly used pressure and temperature are 5.3 to 5.6 GPa and 1250 to 1410° C.

In the fourth embodiment of the present invention, there is provided a process for the synthesis of diamond single crystal by the temperature gradient method, which comprises using a solvent metal to which an Al—X type intermetallic compound wherein X is an element selected from the group consisting of Ti, Zr, Hf, V, Nb and Ta is added as a nitrogen getter.

In this embodiment, the solvent metal preferably consists of at least one member selected from the group consisting of Fe, Co, Ni, Mn and Cr, more preferably containing 0.1 to 6.0 weight % of carbon. The amount of the Al—X type intermetallic compound wherein X is an element selected from the group consisting of Ti, Zr, Hf, V, Nb and Ta, added as a nitrogen getter, is preferably 0.1 to 5 weight % based on the solvent metal.

In order to solve the above described problems, the inventors have made various studies on nitrogen getters to be added and consequently, have found that when Al is added to a solvent and simultaneously, an element having a high reactivity with nitrogen such as Ti, Zr, Hf, etc. is added thereto, the removal efficiency of nitrogen is increased and inclusion of carbides, etc. such as TiC and ZrC, formed in the solvent during the synthesis in the crystal is decreased, thereby obtaining a good quality diamond crystal of IIa type even at a relatively high growth rate.

As a result of further studies, it is found that when an intermetallic compound of Al and Ti is used as a nitrogen getter, the removal efficiency of nitrogen is further increased and formation of carbides, etc. such as TiC is largely suppressed to considerably decrease the inclusion thereof. Thus, it is confirmed that a good quality IIa crystal can be obtained even at a growth rate of about two times higher than that of the prior art and the present invention is thus accomplished.

Figure 12:
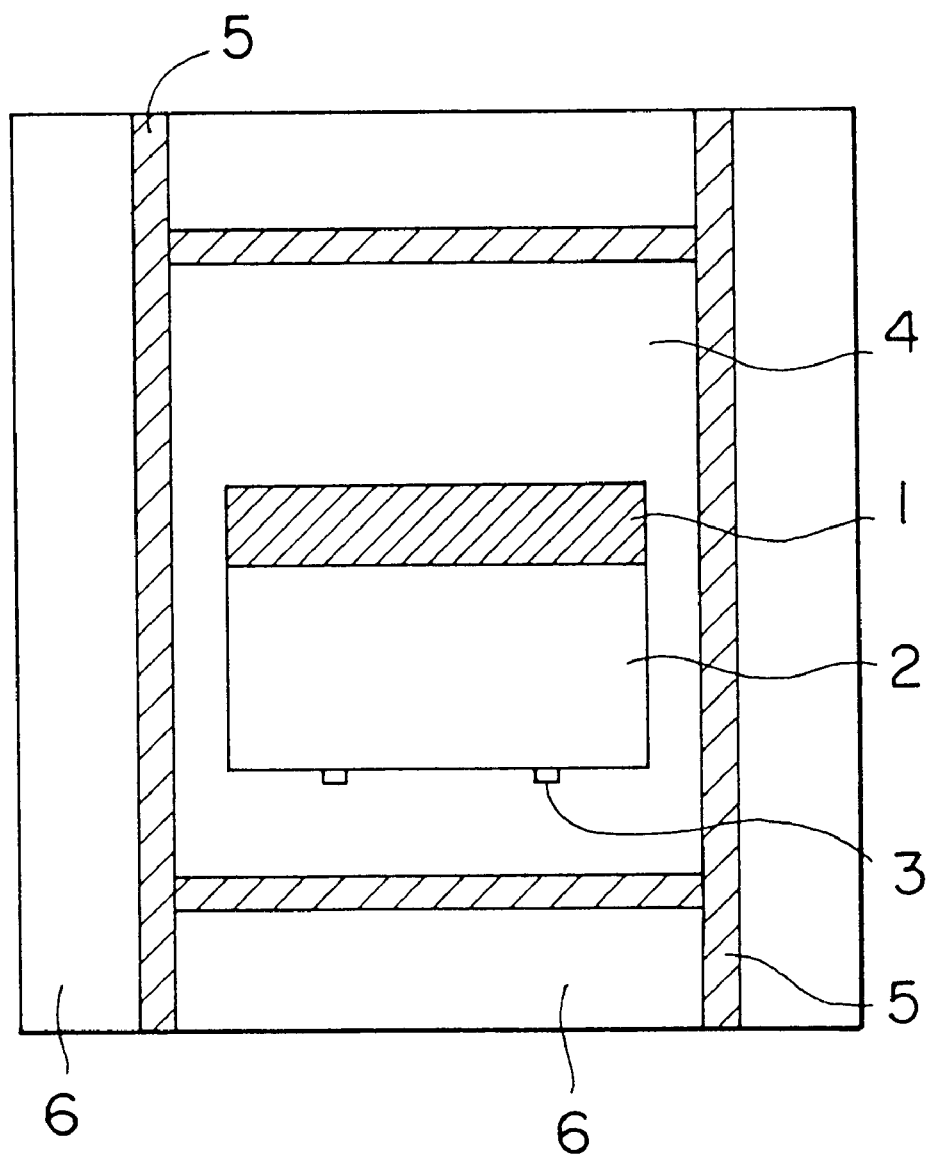
FIG. 12 is a schematic view of a construction of a sample chamber in another embodiment of the present invention.

FIG. 12 is a schematic view of a construction of a sample chamber for the synthesis of a crystal in an embodiment of the present invention, in which a carbon source 1, solvent metal 2, seed crystal 3, insulator 4, graphite heater 5 and pressure medium 6 are arranged, the solvent metal 2 containing a previously added powder of an Al—X type intermetallic compound wherein X is an element selected from the group consisting of Ti, Zr, Hf, V, Nb and Ta.

Examples of the intermetallic comound are Al—Ti intermetallic comounds such as AlTi, $AL_3Ti$, $Al_2Ti$, $AlTi_3$ and the like; Al—Zr intermetallic comounds such as AlZr, $AL_3Zr$, $Al_2Zr$, $Al_3Zr_2$, $Al_3Zr_5$, $Al_2Zr_3$, $AlZr_2$, $AlZr_3$ and the like; Al—Hf intermetallic comounds such as AlHf, $AL_3Hf$, $Al_2Hf$, $Al_3Hf_2$ $AL_3Hf_4$, $Al_2Hf_3$ and the like. In addition, various intermetallic comounds of Al—V, Al—Nb and Al—Ta types can be used.

These intermetallic comounds are preferably used in an amount of as small as possible, but generally in an amount of 0.1 to 5 weight %, since if less than 0.1 weight %, removal of nitrogen cannot sufficiently be carried out and the resultant crystal considerably colors yellowish, while if more than 5 weight %, more inclusions are taken in the crystal.

The solvent metal 2 shown in FIG. 12 is a metal consisting of at least one member selected from the group consisting of Fe, Co, Ni, Mn and Cr and in order to prevent the seed crystal from dissolution, 0.1 to 6.0 weight % of carbon is previously added. When using a solvent having a carbon content of less than 0.1 weight % or containing no carbon, it is required to dispose a seed crystal dissolution preventing agent such as Pt on the seed crystal, but the arrangement of the seed crystal dissolution preventing agent causes polycrystallization or inclusion. This is not preferable. If the carbon content exceeds 6 weight %, spontaneous nucleation tends to occur and crystal growth takes place at other sites than the seed crystal, whereby crystals interferes with each other and no good quality crystal can be obtained.

As the seed crystal and carbon source, there can be used any of known materials in the art. The synthesis conditions by the temperature gradient method can suitably be chosen. Specific examples are given in the following Examples.

According to the process for the synthesis of diamond in this embodiment, an Al—X type intermetallic compound wherein X is an element selected from the group consisting of Ti, Zr, Hf, V, Nb and Ta is added as a nitrogen getter to a solvent metal. Consequently, a good quality diamond crystal of IIa type can be obtained even at a considerably larger growth rate than in the prior art. The reasons therefor will specifically be explained as to Al—Ti intermetallic comounds:

When using only Al as a nitrogen getter as described above, a large amount of addition, e.g. 4 weight % or more is required to synthesize colorless and transparent diamond crystal. Accordingly, inclusions tend to be taken in the crystal and the growth rate should be decreased to at most 1 mg/hr to obtain a good quality crystal. On the other hand, when adding only Ti as a nitrogen getter, even in a very small amount of addition thereof, a colorless and transparent crystal can be obtained, but TiC in a large amount is formed in a solvent and even if the growth rate of the crystal is largely lowered, inclusion of carbides, etc. is increased and a good quality crystal is hardly obtained.

However, such inclusion can be suppressed to some extent by adding Ti as a nitrogen getter and simultaneously adding Al of low viscosity, forming no carbide, to diffuse the formed TiC throughout the solvent metal.

Furthermore, when as in this embodiment, an intermetallic comound consisting of Al and Ti, e.g. AlTi, $Al_3Ti$, $AlTi_3$, etc. is added, formation of TiC is decreased since there is no isolated Ti and even if it is decomposed to form TiC, TiC is readily diffused in the solvent because of the presence of Al in the vicinity of TiC. Consequently, a good quality, inclusion-free crystal can readily be obtained and moreover, the removal efficiency of nitrogen is substantially similar to in the case of Ti, reaching such an extent that nitrogen is substantially removed even by addition of a very small amount, e.g. about 1 weight %. As described above, it is possible to synthesize a good quality, inclusion-free and colorless and transparent diamond crystal of IIa type at a considerably higher rate by the use of an intermetallic comound of Al—Ti type as a nitrogen getter than when using Al and Ti individually or in combination. Specifically, when 1 weight % of an intermetallic comound of Al—Ti is added to the solvent metal, a colorless and transparent diamond crystal of IIa type can be obtained even at a growth rate of 2.5 mg/hr.

In the fifth embodiment of the present invention, there is provided a process for the synthesis of diamond single crystal by the temperature gradient method, which comprises using a solvent metal to which an Sn—X type intermetallic compound wherein X is an element selected from the group consisting of Ti, Zr, Hf, V, Nb and Ta is added as a nitrogen getter.

In this embodiment, the solvent metal preferably consists of at least one memeber selected from the group consisting of Fe, Co, Ni, Mn and Cr, more preferably containing 0.1 to 6.0 weight % of carbon. The amount of the Sn—X type intermetallic compound wherein X is an element selected from the group consisting of Ti, Zr, Hf, V, Nb and Ta, added as a nitrogen getter, is preferably 0.1 to 10 weight % based on the solvent metal.

In order to solve the above described problems, the inventors have made various studies and consequently, have found that when Sn is added to a solvent, the carbon potential in the solvent is increased and non-growing parts on the surface of a growing crystal are decreased so that inclusion in the crystal is somewhat suppressed. When an element having a tendency of forming its carbide, such as Ti, Zr, Hf, etc. is added as a nitrogen getter, and during the same time, Sn is added, carbides formed in the solvent, such as TiC and ZrC are almost diffused in the solvent and floated thereon before taken in the crystal and accordingly, a good quality diamond crystal of IIa type can be obtained even at a relativley high growth rate.

As a result of further studies, it is found that when an intermetallic compound of Sn and Ti or Zr is used as a nitrogen getter, the removal efficiency of nitrogen is further increased and formation of carbides, etc. such as TiC is largely suppressed. Thus, it is confirmed that a good quality IIa crystal can be obtained even at a growth rate of about two times higher than that of the prior art and the present invention is thus accomplished.

FIG. 12 is a schematic view of a construction of a sample chamber for the synthesis of a crystal in an embodiment of the present invention, in which a carbon source 1, solvent metal 2, seed crystal 3, insulator 4, graphite heater 5 and pressure medium 6 are arranged, the solvent metal 2 containing a previously added powder of an Sn—X type intermetallic compound wherein X is an element selected from the group consisting of Ti, Zr, Hf, V, Nb and Ta.

Examples of the intermetallic comound are Sn—Ti intermetallic comounds such as $Sn_5Ti_6$, $Sn_3Ti_5$, $SnTi_2$, $SnTi_3$ and the like; Sn—Zr intermetallic comounds such as SnZr, $Sn_2Zr$, $SnZr_3$ and the like; Sn—V intermetallic comounds such as $SnV_3$ and the like; and Sn—Nb intermetallic comound such as $SnNb_3$ and the like. In addition, various intermetallic comounds of Sn—Hf and Sn—Ta types can be used.

These intermetallic comounds are preferably used in an amount of as small as possible, but generally in an amount of 0.1 to 10 weight %, since if less than 0.1 weight %, removal of nitrogen cannot sufficiently be carried out and the resultant crystal considerably colors yellowish, while if more than 10 weight %, more inclusions are taken in the crystal.

The solvent metal 2 shown in FIG. 12 is a metal consisting of at least one member selected from the group consisting of Fe, Co, Ni, Mn and Cr and in order to prevent the seed crystal from dissolution, 0.1 to 6.0 weight % of carbon is previously added. When using a solvent having a carbon content of less than 0.1 weight % or containing no carbon, it is required to dispose a seed crystal dissolution preventing agent such as Pt on the seed crystal, but the arrangement of the seed crystal dissolution preventing agent causes polycrystallization or inclusion. This is not preferable. If the carbon content exceeds 6 weight %, spontaneous nucleation tends to occur and crystal growth takes place at other sites than the seed crystal, whereby crystals interfere with each other and good quality crystal cannot be obtained.

As the seed crystal and carbon source, there can be used any of known materials in the art. The synthesis conditions by the temperature gradient method can suitably be chosen. Specific examples are given in the following Examples.

According to the process for the synthesis of diamond in this embodiment, an Sn—X type intermetallic compound wherein X is an element selected from the group consisting of Ti, Zr, Hf, V, Nb and Ta is added as a nitrogen getter and as an inclusion inhibitor to a solvent metal. Consequently, a good quality diamond crystal of IIa type can be obtained even at a considerably larger growth rate than in the prior art. The reasons therefor will specifically be explained as to Sn—Ti intermetallic comounds:

When using only Ti as a nitrogen getter as described above, even in a very small amount of addition thereof, a colorless and transparent crystal can be obtained because of its high reactivity with nitrogen, but TiC in a large amount is formed in a solvent and even if the growth rate of the crystal is largely lowered, inclusion of carbides, etc. is increased and a good quality crystal is hardly obtained.

However, such inclusion can be suppressed to some extent by adding Ti as a nitrogen getter and simultaneously adding Sn of low viscosity, forming no carbide, to diffuse the formed TiC throughout the solvent metal. When Sn is added to a solvent, the carbon potential in the solvent is increased and non-embeded materials on the surface of a growing crystal are decreased so that inclusion in the crystal is somewhat suppressed.

Furthermore, when as in this embodiment, an intermetallic comound consisting of Sn and Ti, e.g. $SnTi_3$, $Sn_5Ti_6$ etc., is added, formation of TiC is decreased since there is no isolated Ti and even if the Sn—Ti intermetallic compound is decomposed to form TiC, TiC is readily diffused in the solvent because of the presence of Sn in the vicinity of TiC.

Consequently, a good quality crystal can readily be obtained and moreover, the removal efficiency of nitrogen is substantially similar to in the case of Ti, reaching such an extent that nitrogen is substantially removed even by addition of a very small amount, e.g. about 1 weight %. As described above, it is possible to synthesize a good quality, inclusion-free and colorless and transparent diamond crystal of IIa type at a higher rate by the use of an intermetallic comound of Sn—Ti type as a nitrogen getter than when using other nitrogen getters, e. g. Al or Ti. Specifically, when 1 weight % of an intermetallic comound of $Sn_5Ti_6$ is added to the solvent metal, a colorless and transparent diamond crystal of IIa type can be obtained even at a growth rate of 2.5 mg/hr.

In the sixth embodiment of the present invention, there is provided a process for the synthesis of diamond crystal by the temperature gradient method, which comprises arranging a solvent metal to be contacted with a carbon source, arranging at least one metal slelected from the group consisting of Ti, Zr and Hf as a nitrogen getter at the solvent metal side between the solvent metal and a seed crystal disposed below the solvent metal and arranging Al at the seed crystal side between them in such a manner that the seed crystal is not contacted with the nitrogen getter, and then starting synthesis of diamond using the thus arranged assembly.

In this embodiment, the solvent metal preferably consists of at least one memeber selected from the group consisting of Fe, Co, Ni, Mn and Cr, more preferably containing 0.1 to 6.0 weight % of carbon. The amount of at least one metal selected from the group consisting of Ti, Zr and Hf, added as a nitrogen getter, is preferably 0.2 to 5 volume % based on the solvent metal and the amount of Al added is preferably 0.1 to 2 volume % based on the solvent metal.

In order to synthesize a colorless and inclusion-free diamond crystal at a higher growth rate by adding a nitrogen getter, the following method is employed in this embodiment of the present invention.

That is to say, the inclusion tends to be readily taken in the crystal with increase of the amount of the nitrogen getter and accordingly, it is desired to adjust the amount of the nitrogen getter to as smaller as possible. To this end, Ti, Zr or Hf having a higher reactivity with nitrogen is used as a main nitrogen getter and arranged only near the seed crystal.

Since the metal as the main nitrogen getter tends to react with carbon to form its carbide and causes to be taken in as inclusions, low viscosity Al forming no carbide is disposed between the above described nitrogen getter and seed crystal for the purpose of suppressing growth of the carbide and diffusing the carbide in a solvent before taken in the crystal.

FIG. 11 is a schematic view of a construction of a sample chamber for the synthesis of a crystal in one embodiment of the present invention, in which a sheet 3 consisting of Ti, Zr or Hf as a main nitrogen getter is disposed at the solvent side between a solvent metal 2 and a seed crystal 5 and an Al sheet 4 is disposed at the seed crystal side between them. The nitrogen getter sheet 3 can be composed of Ti, Zr and Hf sheets, individually or in combination, for example, laminated sheets of a Ti sheet and Zr sheet or alloy sheet of Ti—Zr.

As the solvent metal 2, there is used at least one member selected from the group consisting of Fe, Co, Ni, Mn and Cr and in order to prevent the seed crystal 5 from dissolution, 0.1 to 0.6% by weight of carbon is previously added. When using a solvent metal having a carbon content of less than 0.1% by weight or containing no carbon, it is required to dispose a seed crystal dissolution preventing agent such as Pt on the seed crystal and the effect of Al according to the construction of the present invention is not sufficient. If the carbon content exceeds 6 weight %, spontaneous nucleation tends to occur and crystal growth takes place at other sites than the seed crystal, whereby crystals interfere with each other and good quality crystal cannot be obtained.

In this embodiment, it is desired that the amount of Al to be added is adjusted to as small as possible, but it is generally in the range of 0.1 to 2.0 volume % to the solvent, since if less than 0.1 volume %, a layer of carbide of Ti, etc. arranged as a nitrogen getter is formed on the seed crystal to hinder growth of the crystal and the carbide remains more in the crystal, while if more than 2.0 volume %, more inclusions are taken in the crystal.

In this embodiment, the amount of Ti, Zr or Hf to be added as a nitrogen getter is preferably 0.2 to 5 volume % to the solvent, since if less than 0.2 volume %, nitrogen is not sufficiently removed and the crystal colors yellowish, while if more than 5 volume %, inclusions are increased in the crystal.

As the seed crystal and carbon source, there can be used any of known materials in the art. The synthesis conditions by the temperature gradient method can suitably be chosen. Specific examples are given in the following Examples.

According to the process for the synthesis of diamond in this embodiment, Ti, Zr or Hf with high reactivity with nitrogen is used as a main nitrogen getter and disposed only in the vicinity of the seed crystal, so that the nitrogen removal efficiency is high, and nitrogen is sufficiently removed even by addition of a considerably small amount thereof, whereby inclusions are decreased.

Furthermore, Al is arranged on the seed crystal so that Ti, Zr or Hf is not contacted with the seed crystal and accordingly, the carbide such as TiC or ZrC is prevented from remaining in the crystal. Thus, colorless and transparent, inclusion-free diamond crystal can be synthesized at a high growth rate.

In the seventh embodiment of the present invention, there is provided a process for the synthesis of diamond crystal by the temperature gradient method, which comprises arranging a solvent metal to be contacted with a carbon source, arranging at least one metal slelected from the group consisting of Al, Ti, Zr and Hf as a nitrogen getter at the solvent metal side between the solvent metal and a seed crystal disposed below the solvent metal and arranging Sn at the seed crystal side between them in such a manner that the seed crystal is not contacted with the nitrogen getter, and then starting synthesis of diamond using the thus arranged assembly.

In this embodiment, the solvent metal preferably consists of at least one member selected from the group consisting of Fe, Co, Ni, Mn and Cr, more preferably containing 0.1 to 6.0 weight % of carbon. The amount of at least one metal selected from the group consisting of Al, Ti, Zr and Hf, added as a nitrogen getter, is preferably 0.2 to 10 volume % based on the solvent metal and the amount of Sn added is preferably 0.1 to 5 volume % based on the solvent metal.

In order to synthesize a colorless and inclusion-free diamond crystal at a higher growth rate by adding a nitrogen getter, the following method is employed in this embodiment of the present invention.

That is to say, the inclusion tends to be readily taken in the crystal with increase of the amount of the nitrogen getter and accordingly, it is desired to adjust the amount of the nitrogen getter to as little as possible. To this end, a nitrogen getter is arranged only near the seed crystal.

If there are non-embedded materials on the surface of the crystal during growth thereof, the inclusion is taken therein. In order to prevent this, Sn having a function of increasing the carbon potential is disposed between the above described nitrogen getter and seed crystal. When using Ti or Zr capable of readily forming its carbide as a nitrogen getter, the formed carbide causes to hinder growth of the crystal and to be taken in as the inclusion. Sn is capable of suppressing growth of the carbide or diffusing the formed carbide in the solvent before being taken in the crystal.

FIG. 11 is a schematic view of a construction of a sample chamber for the synthesis of a crystal in one embodiment of the present invention, in which a nitrogen getter 3 (sheet-shaped in FIG. 11) consisting of Al, Ti, Zr or Hf is disposed at the solvent side between a solvent metal 2 and a seed crystal 5 and Sn 4 (sheet-shaped in FIG. 11) is disposed at the seed crystal side between them. The nitrogen getter 3 can be composed of Al, Ti, Zr and Hf, individually or in combination, for example, laminated sheets of an Al sheet and Ti sheet or a Ti sheet and Zr sheet, and alloy sheets of Al—Ti slloy or Ti—Zr alloy. 1 designates a carbon source.

As the solvent metal 2, there is used at least one member selected from the group consisting of Fe, Co, Ni, Mn and Cr and in order to prevent the seed crystal 5 from dissolution, 0.1 to 0.6% by weight of carbon is previously added. When using a solvent metal having a carbon content of less than 0.1% by weight or containing no carbon, it is required to dispose a seed crystal dissolution preventing agent such as Pt on the seed crystal and the effect of Sn according to the construction of the present invention is not sufficient. If the carbon content exceeds 6 weight %, spontaneous nucleation tends to occur and crystal growth takes place at other sites than the seed crystal, whereby crystals interfere with each other and good quality crystal cannot be obtained.

In this embodiment, it is desired that the amount of Sn to be added is generally in the range of 0.1 to 5 volume % to the solvent, since if less than 0.1 volume %, there is little effect of preventing inclusions and when using Ti or Zr as a nitrogen getter, a layer of carbide such as TiC, etc. is formed on the seed crystal to hinder growth of the crystal and the carbide remains more in the crystal, while if more than 5 volume %, polycrystallization or spontaneous nucleation tends to occur.

In this embodiment, the amount of Al, Ti, Zr or Hf to be added as a nitrogen getter is preferably 0.2 to 10 volume % to the solvent, since if less than 0.2 volume %, nitrogen is not sufficiently removed and the crystal colors yellowish, while if more than 10 volume %, inclusions are increased in the crystal.

As the seed crystal and carbon source, there can be used any of known materials in the art. The synthesis conditions by the temperature gradient method can suitably be chosen. Specific examples are given in the following Examples.

Figure 2:
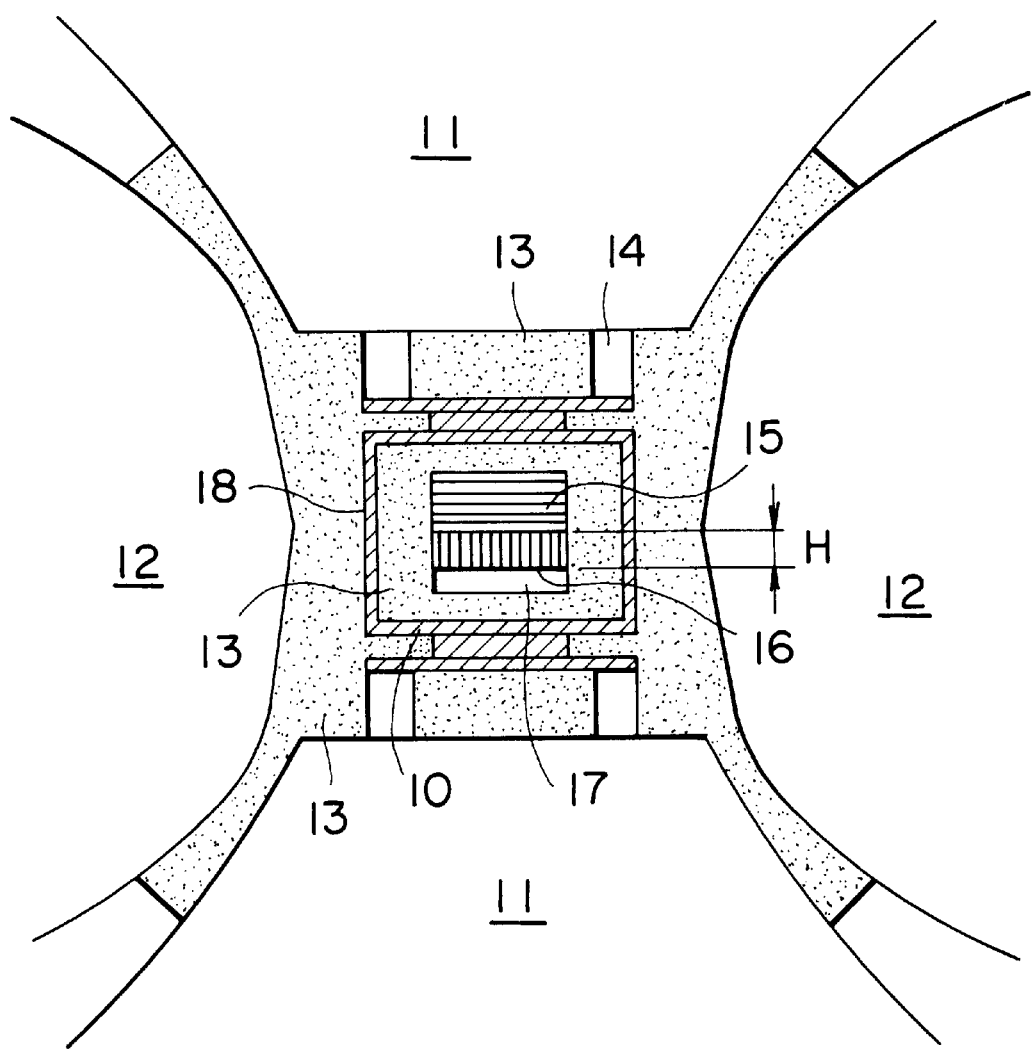
FIG. 2 is a cross-sectional view of an ultra-high pressure cell used for the measurement of the diffusion rate of carbon in a solvent in Experimental Examples.

According to the process for the synthesis of diamond in this embodiment, the nitrogen getter is disposed only in the vicinity of the seed crystal, so that the nitrogen removal efficiency is high, and nitrogen is sufficiently removed even by addition of a considerably small amount thereof, whereby inclusions are decreased.

as shown in FIG. 2. Referring to FIG. 2, a cell 10 surrounded by cemented carbide dies 12 was compressed by pistons 11 faced each other to generate an inner pressure. Electric current was supplied to a current ring 14 and a graphite heater 18 to generate heat through the heater 18 and to maintain uniform the temperatrue inside the heater 18. In the interior of the heater 18, pyrophillite 13 was arranged for insulation and a carbon source 15 and a solvent metal 17 were faced each other and held at a temperature of 20° C. higher than the eutectic temperature of the solvent 17 with carbon for 90 minutes, after which the diffusion coefficient was calculated by measuring the length H of a zone 16, in which carbon was diffused and liquid phase appeared.

The diffusion rate was calculated by the following Formula (1) to obtain results as shown in Table 2:

$$\rho \frac{\partial C}{\partial l} = \rho \cdot D \left( \frac{\partial^2 C}{\partial l^2} \right) \tag{1}$$

in which t=time; D=diffusion coefficient (diffusion rate); C=carbon concentration; M=saturated concentration and l=distance.

The following Formula (2) was derived from Formula (1):

$$C = M \left\{ 1 - \mathrm{erf} \left( \frac{x}{2\sqrt{Dl}} \right) \right\} \tag{2}$$

Formula (2) was developed in a quadratic expression to give the following Formula (3):

$$C/M = \alpha_2 \left( \frac{x}{2\sqrt{Dl}} \right)^2 + \alpha_1 \left( \frac{x}{2\sqrt{Dl}} \right) + \alpha_0 \tag{3}$$

The distance l was changed to obtain the constants, $\alpha_0$, $\alpha_1$ and $\alpha_2$ by changing heating time t. The diffusion coefficient D was estimated by those constants.

TABLE 2

|  | Experiment 1 | Experiment 2 | Experiment 3 | Experiment 4 |
| --- | --- | --- | --- | --- |
| Solvent | Fe-40 Co-2 Al | Fe-40 Ni-2 Al | Fe-2 Al | Ni-40 Cr-2 Al |
| Pressure (GPa) | 5.5 | 5.5 | 5.5 | 5.5 |
| Temperature ° C. | 1320 | 1370 | 1400 | 1250 |
| Diffusion Distance (mm) | 6 | 4.7 | 3.2 | 2.8 |
| Diffusion Coefficient (cm²/sec) | $10.3 \times 10^{-5}$ | $0.3 \times 10^{-5}$ | $0.3 \times 10^{-5}$ | $0.3 \times 10^{-5}$ |

Furthermore, Sn is arranged on the seed crystal so that the carbon potential is increased just before taken in the crystal, whereby embedding or inclusion can be prevented and TiC or ZrC is prevented from remaining in the crystal. Thus, colorless and transparent, inclusion-free diamond crystal can be synthesized at a high growth rate.

The following examples are given in order to illustrate the present invention in detail without limiting the same.

EXAMPLES

Experimental Examples 1–4

In order to measure the diffusion coefficient of carbon in a solvent, an experiment was carried out using a heating cell The similar tests were carried out as to alloys of Al with various elements selected from the group consisting of Fe, Ni, Mn, Cr, Ti, V and Zr in addition to the alloys used for the solvent shown in Table 2. Above all, Fe—Co—Al alloys exhibited the largest diffusion rate.

Examples 1 to 5

Synthesis of a single crystal was carried out in a cell shown in FIG. 1 so as to examine how the color of a synthesized diamond, the absorption spectrum of nitrogen in the infrared range and the amount of metallic impurities in the crystal were changed depending upon the variety of solvents. Referring to FIG. 1, a cell was arranged in cemented carbide dies 2 and a pressure was produced between upper and lower pistons 1 faced each other using pyrophillite 3 as a compressible medium. Electric current was passed through a current ring 7 and a graphite heater 8 to generate heat through the heater 8 and to obtain such a temperature gradient that the central part of the cell was at the highest temperature and the upper and lower end parts were at the lowest temperature. A carbon source 4, solvent 5 and seed crystal 6 were arranged as shown in FIG. 1 and a crystal 9 was epitaxially grown on the seed crystal 6 by a temperature difference T occurred on the carbon source 4 and seed crystal 6, thus obtaining results as shown in Table 3. The synthesis period of time was overall 70 hours.

When synthesis of diamond was similarly carried out as to alloys of Al with a plurality of elements selected from the group consisting of Fe, Ni, Mn, Cr, Ti, V and Zr, there arised a problem that the contents of the metallic solvents were increased and a nitrogen peak took place in the infrared absorption.

Examples 6 to 10

Synthesis of a diamond single crystal was carried out using solvents of Fe—60Co—Al alloys to examine the relationship between the amount of Al and the color of a crystal, the absorption of nitrogen in the infrared region and the inclusion of the solvent metal in the crystal, in the similar manner to Example 1 using the apparatus shown in FIG. 1.

The infrared absorption was measured by means of a Fourier transfer infrared absorption spectrometer (FTIR) and the amount of the solvent impurities was measured by a precision graphic magnetic balance, through the relationship between the magnetic susceptibility and the weight of the solvent previously was sought. The synthesis period of time was overall 60 hours. The results are shown in Table 4.

TABLE 3

|  | Example 1 | Example 2 | Example 3 | Example 4 | Example 5 |
| --- | --- | --- | --- | --- | --- |
| Synthesis Pressure (GPa) | 5.5 | 5.5 | 5.5 | 5.5 | 5.5 |
| Synthesis Temperature (° C.) | 1330 | 1380 | 1410 | 1260 | 1330 |
| Solvent Composition (wt %) | Fe-40 Co-0.5 Al | Fe-40 Ni-2 Al | Fe-2 Al | Ni-40 Co-2 Al | Fe-40 Co |
| Weight of Synthetic Diamond mg | 175 | 166 | 72 | 66 | 170 |
| Growth Rate mg/hr | 2.5 | 2.4 | 1.0 | 0.94 | 2.4 |
| Color* | J | M | J | K | Fancy Yellow |
| Infrared Absorption Coefficient** | not found | 0.15 cm$^{-1}$ | not found | not found | 4.1 cm$^{-1}$ |
| Solvent Content (%) | 0.3 | 0.3 | 0.9 | 1.1 | 0.2 |

(Note):
*Grade Standard of Natural Diamond Gem
**at 1130 cm$^{-1}$

As shown in Table 3, the diamond synthesized using the solvent of Fe—40Co—2Al alloy was most suitable.

TABLE 4

|  | Example 6 | Example 7 | Example 8 | Example 9 | Example 10 |
| --- | --- | --- | --- | --- | --- |
| Synthesis Pressure (GPa) | 5.5 | 5.5 | 5.5 | 5.5 | 5.5 |
| Synthesis Temperature (° C.) | 1300 | 1300 | 1300 | 1300 | 1330 |
| Solvent Composition (wt %) | Fe-60 Co-0.5 Al | Fe-60 Ni-1 Al | Fe-60 Co-2 Al | Fe-60 Co-3 Al | Fe-60 Co-4 Al |
| Weight of Synthetic Diamond mg | 145 | 151 | 155 | 148 | 160 |
| Color* | light, fancy yellow | L | J | H | G |
| Infrared Absorption Coefficient** | 0.4 cm$^{-1}$ | not found | not found | not found | not found |
| Solvent Content (%) | 0.2 | 0.3 | 0.3 | 0.6 | 1.0 |

(Note):
*Grade Standard of Natural Diamond Gem
**at 1130 cm$^{-1}$

As shown in Table 4, the inclusion of solvent metals was less when Al was added in a proportion of at most 2% by weight.

Examples 11 to 15

Synthesis of a diamond single crystal was carried out in the similar manner to Example 1 using the apparatus as shown in FIG. 1 to examine how the color of the synthesized crystal, the nitrogen absorption and the amount of the solvent metal contained in the crystal were changed when the weight proportion y in a Fe-yCo-Al alloy was changed. The synthesis period of time was overall 50 hours. The results are shown in Table 5.

TABLE 5

|  | Example 11 | Example 12 | Example 13 | Example 14 | Example 15 |
|---|---|---|---|---|---|
| Synthesis Pressure (GPa) | 5.5 | 5.5 | 5.5 | 5.5 | 5.5 |
| Synthesis Temperature (° C.) | 1410 | 1360 | 1300 | 1370 | 1420 |
| Solvent Composition (wt %) | Fe-2 Al | Fe-20 Co-1 Al | Fe-60 Co-2 Al | Fe-90 Co-3 Al | Co-2 Al |
| Weight of Synthetic Diamond mg | 53 | 124 | 120 | 122 | 131 |
| Color* | J | J | J | K | L |
| Infrared Absorption Coefficient** | not found | not found | not found | not found | 0.05 cm$^{-1}$ |
| Solvent Content (%) | 1.0 | 0.4 | 0.3 | 0.3 | 0.3 |

(Note):
*Grade Standard of Natural Diamond Gem
**at 1130 cm$^{-1}$

As evident from Table 5, the diamonds synthesized with the solvents containing 20 to 90% by weight of Co had a color of J and K grade, exhibited no detection of infrared absorption and gave less solvent content in the crystal.

Examples 16 to 18

Whether a crystal became transparent by addition of B or Ga was examined to confirm the doping effect of a p-type semiconductor element, using a solvent of Fe—40Co—2Al alloy (total weight: 20 g). The synthesis time was 44 hours and the synthesis pressure was 5.4 GPa. The results are shown in Table 6.

TABLE 6

|  | Example 16 | Example 17 | Example 18 |
|---|---|---|---|
| Synthesis Temperature (° C.) | 1330 | 1330 | 1320 |
| Amount of Added Elements | no | B (35 ppm) | Ga (0.4 wt %) |
| Weight of Synthetic Diamond mg | 112 | 110 | 105 |
| Color* | J | F | G |
| Infrared Absorption Coefficient** | not found | not found | not found |
| Solvent Content (%) | 0.3 | 0.3 | 0.4 |

(Note):
*Grade Standard of Natural Diamond Gem
**at 1130 cm$^{-1}$

As shown in Table 6, it was confirmed that the color grade was improved by the addition of a micro amount of B or Ga. The addition of B in a proportion of less than 25 ppm had no effect of rendering colorless, while the addition of Ga in a proportion of exceeding 2% by weight resulted inclusion of the solvent. Similar experiments were carried out as to addition of Be, Li and In to obtain the similar results.

Examples 19 to 24

Figure 7:
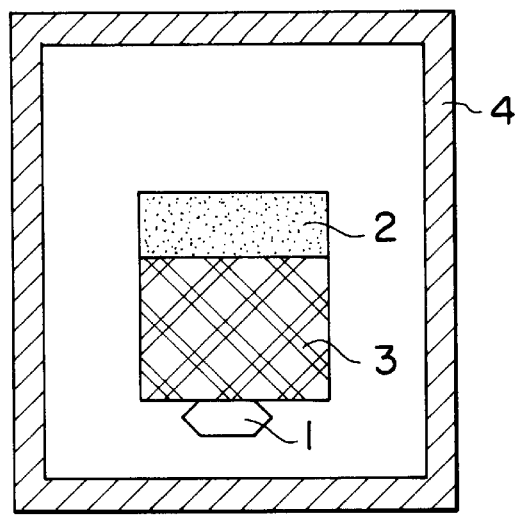
FIG. 7 is a schematic view of a construction of a sample in a synthesis chamber.

In a diamond synthesis chamber surrounded by a heater 4 were arranged a standard sample construction consisting of a seed crystal 1, a solvent metal 3 and a carbon source 2, and an Al-activity increasing material in suitable manner, as shown in FIG. 7, to examine and confirm the advanatges given thereby.

The solvent metal had a composition of Fe-40% Co-1% Al (weight ratio) and Pb was used as the Al-activity increasing material and arranged in the form of a thin sheet of 0.1 mm in thickness between the carbon source 2 and the solvent metal 3. The amount of Pb was 0.5 weight % based on the solvent so as to give 1.25 times as much as the activity of Al when 4 weight % of Al was added. This value was determined assuming that the activity of Al depends on the weight ratio of the solvent to Al.

As shown in FIG. 7, the sample-arranged synthesis chamber was set in an apparatus for generating an ultra-high pressure and high temperature and maintained at a pressure of 5.8 GPa and a temperature of 1350° C. After the synthesis, the resulting single crystal was subjected to observation or measurement of the color, nitrogen concentration and metal content.

Similar experiments were carried out as to In, Bi and Cd as Al-activity increasing materials and for comparison, tests were carried out as to a sample containing no Al-activity increasing material and another sample containing no Al-activity increasing material and having an Al content of 4 weight % (Examples 20 to 24). The test results are shown in Table 7.

TABLE 7

|  | Example | | | | | |
|---|---|---|---|---|---|---|
|  | 19 | 20 | 21 | 22 | 23 | 24 |
| Activity Increasing Material | Pb | In | Bi | Cd | no | no |
| Amount of Activity Increasing Material (wt %) | 0.5 | 2.0 | 1.2 | 1.0 | — | — |

TABLE 7-continued

| | Example | | | | | |
|---|---|---|---|---|---|---|
| | 19 | 20 | 21 | 22 | 23 | 24 |
| Shape of Activity Increasing Material | thin sheet | powder | powder | thin sheet | — | — |
| Amount of Al Added (%) | 1.0 | 1.0 | 1.0 | 1.0 | 1.0 | 4.0 |
| Color of Single Crystal | color-less, trans-parent | ← | ← | ← | light yellow | color-less, trans-parent |
| Nitrogen Concentration in Single Crystal (ppm) | <0.4 | <0.4 | <0.4 | <0.4 | 0.9 | <0.4 |
| Metal Content (wt %) | <0.5 | <0.5 | <0.5 | <0.5 | <0.5 | 1.7 |

(note): "←" same as left

As evident from Table 7, when such a material as capable of increasing the activity of Al was added, the color of the single crystal was colorless and transparent and inclusion was less as represented by a metal content of at most 0.5 weight %.

On the other hand, when an activity increasing material was not added even if 1 weight % of Al was added, the crystal colored light yellow and had a high nitrogen concentration. For obtaining a colorless and transparent crystal without adding activity increasing material, about 4 weight % of Al was required and when the crystal growth was carried out at the same growth rate as in these Examples 19 to 22, it was difficult to grow a good quality crystal with a high metal content.

Examples 25 to 28

Example 19 was repeated except changing only the amount of the activity increasing material, thus obtaining results as shown in Table 8:

TABLE 8

| | Example | | | |
|---|---|---|---|---|
| | 25 | 26 | 27 | 28 |
| Activity Increasing Material | Pb | In | Bi | Cd |
| Amount of Activity Increasing Material (wt %) | 0.3 | 4.5 | 0.3 | 4.2 |
| Amount of Al Added (%) | 1.0 | 1.0 | 1.0 | 1.0 |
| Color of Single Crystal | light yellow | colorless, transparent | light yellow | colorless, transparent |
| Nitrogen Concentration in Single Crystal (ppm) | 0.8 | <0.4 | 0.8 | <0.4 |
| Metal Content (wt %) | <0.5 | <1.2 | <0.5 | <1.0 |

As evident from Table 8, if the amount of the activity increasing material was at most 0.3 weight %, there was little effect of accelerating removal of nitrogen in the crystal and the crystal colored light yellow, while if it was at least 4.0 weight %, the crystal was colorless, but inclusion of the solvent metal in the crystal was increased and it was difficult to grow a good quality crystal.

Examples 29 to 36

Using the temperature gradient method in the stable region of diamond (5.4 GPa, 1320° C.), diamond of 0.6 to 0.8 carat was grown on a seed crystal for 60 hours. As a synthesis solvent, there was used an Fe—Co alloy to which Ti, Al and C were added to obtain results shown in Table 9. The nitrogen concentration in the crystal was determined by ESR (electron-spin resonance) and the amount of inclusion of the solvent was measured by a magnetic balance.

TABLE 9

| | Examples | | | |
|---|---|---|---|---|
| | 29 | 30 | 31 | 32 |
| Solvent Composition (wt %) | Fe-40 Co-0.3 Ti | Fe-40 Co-0.5 Ti | Fe-40 Co-0.5 Al-0.5 Ti | Fe-40 Co-0.5 Al-1.2 Ti |
| Color | M | H | H | F |
| Amount of Nitrogen (ppm) | 0.95 | 0.2 | 0.2 | ≦0.1 |
| Inclusion of Solvent (wt %) | 1.5 | 2.1 | 0.3 | 0.3 |
| Possibility of Decorative Use | nearly zero | very low | yes | yes |

| | Examples | | | |
|---|---|---|---|---|
| | 33 | 34 | 35 | 36 |
| Solvent Composition (wt %) | Fe-40 Co-0.5 Al-7 Ti | Fe-40 Co-3 Al-1.2 Ti | Fe-40 Co-5 Al-1.2 Ti | Fe-40 Co-3 Al-10 Ti |
| Color | F | F | F | F |
| Amount of Nitrogen (ppm) | ≦0.1 | ≦0.1 | ≦0.1 | ≦0.1 |
| Inclusion of Solvent (wt %) | 0.4 | 0.4 | 1.1 | 1.5 |
| Possibility of Decorative Use | yes | yes | low | very low |

As shown in Table 9, when only Ti was added, the color grade was at least H in an amount of 0.5 weight % and the including amount of the solvent was increased, thus deteriorating the worth as decorative use.

The including amount of the solvent was largely decreased by increasing Al to obtain a good quality crystal. However, when 5 weight % of Al was added, the including amount of the solvent was increased. Even when Al was added, addition of 10 weight % of Ti results in increase of the including amount of the solvent and a good quality crystal was not obtained.

As explained above, the additive range of Al and Ti whereby a good color and quality crystal can be obtained are repectively 0.5≦Al≦3 (weight %) and 0.5≦Ti≦7 (weight %). Furthermore, when Sn, In, Ag, Cu, Cs, Pb, Sb or Zn was used instead of Al, similar results were obtained.

Examples 37 to 44

Using the temperature gradient method in the stable region of diamond (5.3 GPa, 1320° C.), diamond of IIa type of 8 to 10 carat was grown on a seed crystal for 140 hours. As the seed crystal, a single crystal of 3 mm was used. The solvent was prepared by previously preparing an ingot of an alloy, pulvering the ingot and mixing the resulting powder with carbon powder. The alloy had a composition of Fe—Co—Ni to which Zr, Hf, V or Ti had been added as a nitrogen getter and Sn, In, Ga or Zn had been added as a viscosity lowering material.

The synthesized crystal was worked in a disk and subjected to spectroscopic analysis of UV, visible and infrared wave ranges and to examination of carbides and nitrides in the crystal by means of a transmission electron microscope. Adaptability of the crystal whether it can be used as a window material or not was judged by spectroscopic analysis and a microscope to obtain results shown in Table 10:

TABLE 10

|  | Examples | | | |
|---|---|---|---|---|
|  | 37 | 38 | 39 | 40 |
| Solvent Composition (wt %) | Fe-30 Co-10 Ni-2 Zr | Fe-30 Co-10 Ni-2 Zr-1 Sn | Fe-40 Co-15 Ni-3 Hf | Fe-40 Co-15 Ni-3 Hf-30 In |
| Spectroscopic Analysis | no absorption, good | ← | ← | ← |
| Presence of Carbides and Nitrides | upper and lower parts of crystal | not found | lower part of crystal | not found |
| Adaptability to Window Material | unsuitable | suitable | unsuitable | suitable |

|  | Examples | | | |
|---|---|---|---|---|
|  | 41 | 42 | 43 | 44 |
| Solvent Composition (wt %) | Fe-25 Co-25 Ni-2.5 V | Fe-25 Co-25 Ni-25 V-1.5 Ga | Fe-10 Co-40 Ni-3.5 Ti | Fe-10 Co-40 Ni-3.5 Ti-2 Zr |
| Spectroscopic Analysis | no absorption, good | ← | ← | ← |
| Presence of Carbides and Nitrides | lower part of crystal | not found | lower part of crystal | not found |
| Adaptability to Window Material | unsuitable | suitable | unsuitable | suitable |

As evident from Table 10, when only the nitrogen getter was added, carbides and nitrides (mainly carbides) were formed and included in the crystal and the resulting crystal could not be used as a window material. When Sn, In, Ga or Zn was added, on the other hand, the carbides and nitrides were floated or precipitated in a short time and thus not included in the crystal to obtain a good quality crystal.

Example 45

Carbon powder and Zr powder with varied grain diameters were added to an Fe-60 Co alloy powder and calcined to prepare a solvent to examine the addition effect depending on the grain diameter of the nitrogen getter. The Zr powder was used in a proportion of 1.5 weight %.

Using the temperature gradient method at an ultra-high pressure and a high temperature (5.5 GPa, 1330° C.), gem stone of about 0.4 to 0.6 carat was obtained. The results are shown in the following table.

TABLE 11

|  | Zr Grain Diameter | | | |
|---|---|---|---|---|
|  | 5 μm | 10 μm | 1 mm | 2 mm |
| Weight of Synthetic Diamond (carat) | 0.55 | 0.58 | 0.42 | 0.51 |
| Nitrogen Content (ppm) | 0.1 | ≦0.1 | 0.2 | 0.5 |
| Color Grade | G | F | H | K |
| Solvent Content (wt %) | 1.9 | 0.3 | 0.2 | 0.2 |

As shown in Table 11, it was found suitable that Zr powder had a grain diameter of 10 μm to 1 mm. Similar results were obtained as to Ti, Hf, V, Ta, and Nb.

Examples 46 to 49

To an Fe-50 Co-1.5 Al-1.5 Ti-4.5 C alloy was added B or Ga in an amount of 0.2 ppm to 2.5 weight % to examine the addition effect of the p-type semiconductor element.

Using the temperature gradient method at an ultra-high pressure and a high temperature (5.5 GPa), diamond was synthesized for 55 hours to obtain results shown in the following table.

TABLE 12

|  | Example 46 | Example 47 | Example 48 | Example 49 |
|---|---|---|---|---|
| Synthesis Temperature (° C.) | 1330 | 1330 | 1320 | 1320 |
| Amount of Added Elements | no | B (0.2 ppm) | Ga (0.4 wt %) | Ga (2.5 wt %) |
| Weight of Synthetic Diamond mg | 112 | 110 | 105 | 125 |
| Color* | F | E | E | E |
| Infrared Absorption Coefficient** | not found | not found | not found | not found |
| Solvent Content (wt %) | 0.3 | 0.3 | 0.4 | 1.4 |

(Note):
*Grade Standard of Natural Diamond Gem
**at 1130 cm$^{-1}$

As shown in Table 12, diamond with a color grade of E that had not been obtained before was obtained by adding B or Ga in a suitable amount.

Example 50

As a raw material of a solvent, high purity Fe powder with a grain diameter of 50 to 100 μm, Co powder and graphite powder were used and mixed in a proportion of Fe:Co:C= 60:40:4.5 by weight. In addition, an AlTi intermetallic compound with an average grain diameter of 50 μm containing about 5 weight % AlTi$_3$ was added in an amount of 1 weight % to the solvent and adequately mixed. The mixed powder was molded, degassed and calcined to obtain a solvent with a diameter of 20 mm and a thickness of 10 mm. As a carbon source, there was used diamond powder and as a seed crystal, there were used three diamond crystals of about 500 μm in diameter.

In a construction of a sample chamber as shown in FIG. 12, the assembly was set within a heater 5 in such a manner that a temperature gradient of about 30° C. was provided between the carbon source 1 and seed crystals 3 and maintained at a pressure of 5.5 GPa and a temperature of 1300° C. for 70 hours in an ultra-high pressure producing apparatus, thereby synthesizing diamond.

Consequently, three colorless and transparent, substantially inclusion-free, high quality IIa type diamond crystals of 0.7 to 0.9 carat were obtained all of which had a nitrogen concentration of at most 0.1 ppm, measured by ESR, and an inclusion concentration of at most 0.3 weight %, measured by a magnetic balance.

Examples 51 to 53

Synthesis of diamond was carried out in an analogous manner to Example 50 except varying the amount of the AlTi intermetallic compound powder in 0.5, 2.0 and 4.0 weight % based on the amount of the solvent metal, thus obtaining good quality IIa type diamond crystals of 0.8 carat in any case, whose nitrogen concentrations and inclusion concentrations, measured similarly, were shown in Table 13 with those of Example 50:

TABLE 13

| | Example | | | |
|---|---|---|---|---|
| | 51 | 50 | 52 | 53 |
| Amount of AlTi (wt %) | 0.5 | 1.0 | 2.0 | 4.0 |
| Amount of Nitrogen (ppm) | 0.1–0.2 | <0.1 | <0.1 | <0.1 |
| Amount of Inclusion (wt %) | <0.3 | <0.3 | <0.3 | 0.3–0.5 |

When the amount of nitrogen is less than 0.2 ppm, the crystal is substantially colorless and transparent and there is no problem on us the diamond for decoration and optical parts. When the amount of inclusion is less than 0.5 weight %, the inclusion is distributed only in the vicinity of the seed crystal, that is, in such a limited part of the lower part of the crystal that the inclusion can readily be removed by some polishing and there arises no problem. Therefore, the crystals have such quality that they can be applied to decorative use and optical parts. The growth rate is 2 to 2.5 mg/hr, which corresponds to at least 2 times of the critical rate for synthesizing a similar crystal in the prior art.

Example 54

Synthesis of diamond crystal was carried out in an analogous manner to Example 50 except using an AlZr intermetallic compound powder instead of the AlTi intermetallic compound powder, thus obtaining a good quality diamond of IIa type substantially similar to that of Example 50.

Example 55

Synthesis of diamond crystal was carried out in an analogous manner to Example 50 except using an AlHf intermetallic compound powder instead of the AlTi intermetallic compound powder, thus obtaining a good quality diamond of IIa type substantially similar to that of Example 50.

Example 56

Synthesis of diamond crystal was carried out in an analogous manner to Example 50 except using an $AlTi_3$ intermetallic compound powder containing about 20% of AlTi instead of the AlTi intermetallic compound powder, thus obtaining a good quality diamond of IIa type substantially similar to that of Example 50.

Example 57

Synthesis of diamond crystal was carried out in an analogous manner to Example 50 except using an $Al_3$ Ti intermetallic compound powder containing about 10% of AlTi instead of the AlTi intermetallic compound powder, thus obtaining a good quality diamond of IIa type substantially similar to that of Example 50.

Example 58

Synthesis of diamond crystal was carried out in an analogous manner to Example 50 except using, V intermetallic compound powder instead of the AlTi intermetallic compound powder, thus obtaining a good quality diamond of IIa type substantially similar to that of Example 50.

Example 59

Synthesis of diamond crystal was carried out in an analogous manner to Example 50 except using an Al s Nb intermetallic compound powder instead of the AlTi intermetallic compound powder, thus obtaining a good quality diamond of IIa type substantially similar to that of Example 50.

Example 60

Synthesis of diamond crystal was carried out in an analogous manner to Example 50 except using, as a raw material of a solvent, high purity Fe powder with a grain diameter of 50 to 100 ρm, Ni powder, Co powder and graphite powder and mixing them in a proportion of Fe:Ni:Co:C= 60:30:10:4.2 by weight, thus obtaining a good quality diamond of IIa type substantially similar to that of Example 50.

Example 61

Synthesis of diamond crystal was carried out in an analogous manner to Example 50 except using, as a raw material of a solvent, high purity Fe powder with a grain diameter of 50 to 100 ρm, Ni powder, Mn powder and graphite powder and mixing them in a proportion of Fe:Ni:Mn:C= 60:30:10:4.0 by weight, thus obtaining a good quality diamond of IIa type substantially similar to that of Example 50.

Example 62

Synthesis of diamond crystal was carried out in an analogous manner to Example 50 except using, as a raw material of a solvent, high purity Fe powder with a grain diameter of 50 to 100 μm, Ni powder and graphite powder and mixing them in a proportion of Fe:Ni:C=70:30:3.5 by weight, thus obtaining a good quality diamond of Iha type substantially similar to that of Example 50.

Example 63

Synthesis of diamond crystal was carried out in an analogous manner to Example 50 except using, as a raw material of a solvent, high purity Co powder with a grain diameter of 50 to 100 μm and graphite powder, mixing them in a proportion of Co:C=100:4.7 by weight and adjusting the synthetic temperature condition to 1350° C., thus obtaining a good quality diamond of IIa type substantially similar to that of Example 50.

Example 64

Synthesis of diamond crystal was carried out in an analogous manner to Example 50 except using, as a raw material of a solvent, high purity Ni powder with a grain diameter of 50 to 100 μm and graphite powder, mixing them in a proportion of Ni:C=100:4.2 by weight and adjusting the synthetic temperature condition to 1350° C., thus obtaining a good quality diamond of IIa type substantially similar to that of Example 50.

Example 65

Synthesis of diamond crystal was carried out in an analogous manner to Example 50 except adding 0.5 weight % of an AlTi intermetallic compound powder and 0.5 weight % of an AlZr intermetallic compound powder instead of adding 1 weight % of the AlTi intermetallic compound powder to the metal solvent, thus obtaining a good quality diamond of IIa type substantially similar to that of Example 50.

Example 66 to 71

Synthesis of diamond crystal was carried out in an analogous manner to Example 50 except adding a Ti powder with an average grain diameter of 50 μm or Al powder with an average grain diameter of 50 μm with changing the addition amount thereof instead of adding the AlTi intermetallic compound powder to the metal solvent. The measured results of the nitrogen concentration and the inclusion concentration of the resulting diamonds are shown in Table 14.

TABLE 14

|  | Example | | | | | |
| --- | --- | --- | --- | --- | --- | --- |
|  | 66 | 67 | 68 | 69 | 70 | 71 |
| Amount of Al (wt %) | 4 | 1 | 0 | 0 | 0 | 1 |
| Amount of Ti (wt %) | 0 | 0 | 0 | 1 | 2 | 1 |
| Amount of Nitrogen (ppm) | 3 | 7 | 88 | 0.2 | <0.1 | <0.1 |
| Amount of Inclusion (wt %) | 2.5 | 0.4 | <0.3 | 1.3 | 2.6 | 0.5 |

All the crystals had large amounts of nitrogen and inclusion and colored so yellow that they could not be applied to decorative use and optical parts.

Example 72

Synthesis of diamond crystal was carried out in an analogous manner to Example 50 except using, as a raw material of a solvent, high purity Fe powder with a grain diameter of 50 to 100 μm, Ni powder and Co powder and mixing them in a proportion of Fe:Ni:Co=60:30:10 by weight, and adding no graphite. Consequently, the seed crystals were completely dissolved in the solvent and disappeared. There was found no growth of diamond.

Example 73

Synthesis of diamond crystal was carried out in an analogous manner to Example 50 except using, as a raw material of a solvent, high purity Fe powder with a grain diameter of 50 to 100 μm, Ni powder, Co powder and graphite powder and mixing them in a proportion of Fe:Ni:Co:C=60:30:10:7 by weight. Consequently, a number of spontaneous diamond nucleations took place from other sites than the seed crystals and the crystals interfered with each other, thus hardly obtaining good quality crystal.

Example 74

This example was carried out so as to examine the effect obtained by adding a low viscosity metal and a nitrogen getter metal in the form of an intermetallic compound thereof. As the intermetallic compound, $Sn_5Ti_6$ was used.

As a raw material of a solvent, high purity Fe powder with a grain diameter of 50 to 100 μm, Co powder and graphite powder were used and mixed in a proportion of Fe:Co:C=60:40:4.5 by weight. In addition, an $Sn_5Ti_6$ intermetallic compound with an average grain diameter of 50 μm, as an additive, was added in an amount of 1 weight % (Sn 0.5 wt %, Ti 0.5 wt %) to the solvent metal (except graphite) and adequately mixed. The mixed powder was molded, degassed and calcined to obtain a solvent with a diameter of 20 mm and a thickness of 10 mm. As a carbon source, there was used diamond powder and as a seed crystal, there were used three diamond crystals of about 500 μm in diameter. In a construction of a sample chamber as shown in FIG. 12, the assembly was set within a heater 5 in such a manner that a temperature gradient of about 30° C. was provided between the carbon source 1 and seed crystals 3 and maintained at a pressure of 5.5 GPa and a temperature of 1300° C. for 70 hours in an ultra-high pressure producing apparatus, thereby synthesizing diamond.

Consequently, three colorless and transparent, substantially inclusion-free, high quality IIa type diamond crystals of 0.7 to 0.9 carat were obtained all of which had a nitrogen concentration of at most 0.1 ppm, measured by ESR, and an inclusion concentration of at most 0.3 weight %, measured by a magnetic balance. The color grade was "F".

On the other hand, the same composition as described above was melted in vacuum, completely alloyed and used as a solvent. When diamond was synthesized under the same conditions as described above, there was obtained one having a nitrogen concentration of 0.2 ppm and a color grade of H. When adding Ti and Sn, the nitrogen removal effect was more in the case of adding in the form of an intermetallic compound.

Examples 75 to 78

Synthesis of diamond was carried out in an analogous manner to Example 74 except varying the amount of the $Sn_5Ti_6$ intermetallic compound powder in 0.5, 2.0, 4.0 and 8.0 weight % based on the amount of the solvent metal (except graphite), thus obtaining good quality IIa type diamond crystals of 0.8 carat in any case, whose nitrogen concentrations and inclusion concentrations, measured similarly, were respectively at most 0.2 ppm and at most 0.3 weight %.

Example 79

Synthesis of diamond crystal was carried out in an analogous manner to Example 74 except using an $SnZr_4$ intermetallic compound powder, as an additive, instead of the $Sn_5Ti_6$ intermetallic compound powder, thus obtaining a good quality diamond of IIa type substantially similar to that of Example 74.

Example 80

Synthesis of diamond crystal was carried out in an analogous manner to Example 74 except using an $SnV_3$ intermetallic compound powder, as an additive, instead of the $Sn_5Ti_6$ intermetallic compound powder, thus obtaining a good quality diamond of IIa type substantially similar to that of Example 74.

Example 81

Synthesis of diamond crystal was carried out in an analogous manner to Example 74 except using an $SnNb_3$ intermetallic compound powder, as an additive, instead of the $Sn_5Ti_6$ intermetallic compound powder, thus obtaining a good quality diamond of IIa type substantially similar to that of Example 74.

Example 82

Synthesis of diamond crystal was carried out in an analogous manner to Example 74 except using, as a raw material of a solvent, high purity Fe powder with a grain diameter of 50 to 100 μm, Ni powder, Co powder and graphite powder and mixing them in a proportion of Fe:Ni:Co:C=60:30:10:4.2 by weight, thus obtaining a good quality diamond of IIa type substantially similar to that of Example 74.

Example 83

Synthesis of diamond crystal was carried out in an analogous manner to Example 74 except using, as a raw material of a solvent, high purity Fe powder with a grain diameter of 50 to 100 μm, Ni powder, Mn powder and graphite powder and mixing them in a proportion of Fe:Ni:Mn:C= 60:30:10:4.0 by weight, thus obtaining a good quality diamond of IIa type substantially similar to that of Example 74.

Example 84

Synthesis of diamond crystal was carried out in an analogous manner to Example 74 except using, as a raw material of a solvent, high purity Fe powder with a grain diameter of 50 to 100 μm, Ni powder and graphite powder and mixing them in a proportion of Fe:Ni:C=70:30:3.5 by weight, thus obtaining a good quality diamond of Ia type substantially similar to that of Example 74.

Example 85

Synthesis of diamond crystal was carried out in an analogous manner to Example 74 except using, as a raw material of a solvent, high purity Co powder with a grain diameter of 50 to 100 μm and graphite powder, mixing them in a proportion of Co:C=100:4.7 by weight and adjusting the synthetic temperature condition to 1350° C., thus obtaining a good quality diamond of IIa type substantially similar to that of Example 74.

Example 86

Synthesis of diamond crystal was carried out in an analogous manner to Example 74 except using, as a raw material of a solvent, high purity Ni powder with a grain diameter of 50 to 100 μm and graphite powder, mixing them in a proportion of Ni:C=100:4.2 by weight and adjusting the synthetic temperature condition to 1350° C., thus obtaining a good quality diamond of IIa type substantially similar to that of Example 74.

Example 87

Synthesis of diamond crystal was carried out in an analogous manner to Example 74 except adding 1 weight % of Ti powder having an average grain diameter of 50 μm and not adding the $Sn_5Ti_6$ intermetallic compound, thus obtaining a crystal having a small amount of nitrogen, i.e. 0.2 ppm. However, the growth quantity was about 0.3 carat per one crystal. A large amount of TiC was found in the crystal and inclusion of the solvent reached about 1.3 weight % to give no good crystal.

Example 88

When the procedure of Example 74 was repeated except using 15 weight % of the $Sn_5Ti_6$ intermetallic compound to synthesize diamond crystal, the crystal grown from the seed crystal was polycrystalline to give no good single crystal.

Example 89

Synthesis of diamond crystal was carried out in an analogous manner to Example 74 except adding 0.5 weight % of Sn powder and 0.5 weight % of Ti powder each having an average grain diameter of 50 μm and not adding the $Sn_5Ti_6$ intermetallic compound, thus obtaining a crystal of about 0.8 carat having a small amount of nitrogen, i.e. 0.2 ppm but having somewhat a large amount of inclusion, i.e. 0.7 weight %.

Example 90

Synthesis of diamond crystal was carried out in an analogous manner to Example 74 except using, as a raw material of a solvent, high purity Fe powder with a grain diameter of 50 to 100 μm, Ni powder and Co powder and mixing them in a proportion of Fe:Ni:Co=60:30:10 by weight, and adding no graphite. Consequently, the seed crystals were completely dissolve in the solvent and disappeared. There was found no growth of diamond.

Example 91

Synthesis of diamond crystal was carried out in an analogous manner to Example 74 except using, as a raw material of a solvent, high purity Fe powder with a grain diameter of 50 to 100 μm, Ni powder, Co powder and graphite powder and mixing them in a proportion of Fe:Ni:Co:C=60:30:10:7 by weight. Consequently, a number of spontaneous diamond nucleations took place from other sites than the seed crystals and the crystals interfered with each other, thus hardly obtaining good quality crystal.

Example 92

In a construction of a sample chamber as shown in FIG. 11, diamond powder was used as a carbon source 1 and an alloy having a composition of Fe:Co:C=60:40:4.5 in the form of a diameter of 20 mm and a thickness of 10 mm was used as a solvent metal 2. As a nitrogen getter 3 at the solvent metal side, there was disposed a Ti sheet having a diameter of 20 mm and a thickness of 0.1 mm and as a low viscosity metal 4 at the seed crystall side, there was disposed an Al sheet having a diameter of 20 mm and a thickness of 0.1 mm. During the same time, the amount of Ti was 1 volume % to the solvent and that of Al was 1 volume % to the solvent. As a seed crystal 5, three diamond crystals each having about a diameter of 500 μm were used. The sample chamber was set in a heater in such a manner that a temperature gradient of about 30° C. was provided between the carbon source and seed crystal and maintained at a pressure of 5.5 GPa and a temperature of 1300° C. for 70 hours in an ultra-high pressure producing apparatus, thereby synthesizing diamond.

Consequently, three colorless and transparent, substantially inclusion-free, high quality IIa type diamond crystals of 0.7 to 0.9 carat were obtained all of which had a nitrogen concentration of at most 0.1 ppm, measured by ESR, and an inclusion concentration of at most 0.3 weight %, measured by a magnetic balance.

Examples 93 to 96

Diamond was synthesized in an analogous manner to Example 92 except changing the thickness of Ti and Al sheets as shown in Table 15. A good quality IIa type diamond crystal of about 0.8 carat was obtained having a nitrogen concentration and inclusion concentration measured as shown in Table 15. The results of Example 92 are also shown in Table 15.

TABLE 15

|  | Example | | | | |
| --- | --- | --- | --- | --- | --- |
|  | 92 | 93 | 94 | 95 | 96 |
| Ti | | | | | |
| Thickness (mm) | 0.1 | 0.1 | 0.05 | 0.2 | 0.4 |
| Addition Amount to Solvent (vol %) | 1 | 1 | 0.5 | 2 | 4 |

TABLE 15-continued

| | Example | | | | |
|---|---|---|---|---|---|
| | 92 | 93 | 94 | 95 | 96 |
| Al | | | | | |
| Thickness (mm) | 0.1 | 0.05 | 0.05 | 0.1 | 0.1 |
| Addition Amount to Solvent (vol %) | 1 | 0.5 | 0.5 | 1 | 1 |
| Amount of Nitrogen (ppm) | <0.1 | <0.1 | 0.1–02 | <0.1 | <0.1 |
| Amount of Inclusion (wt %) | <0.3 | <0.3 | <0.3 | 0.3–0.4 | 0.4–0.5 |

When the amount of nitrogen is less than 0.2 ppm in the diamond crystal, the crystal is substantially colorless and transparent and there is no problem on use of the diamond for decoration and optical parts. When the amount of inclusion is less than 0.5 weight %, the inclusion is distributed only in the vicinity of the seed crystal, that is, in such a limited part of the lower part of the crystal that the inclusion can readily be removed by some polishing and there arises no problem. Therefore, the crystals in Examples 92 to 96 have such quality that they can be applied to decorative use and optical parts. The growth rate is 2 to 2.5 mg/hr, which corresponds to at least 2 times of the critical rate for synthesizing a similar crystal in the prior art.

Example 97

Synthesis of diamond crystal was carried out in an analogous manner to Example 92 except using Zr instead of Ti, thus obtaining a good quality diamond of IIa type substantially similar to that of Example 92.

Example 98

Synthesis of diamond crystal was carried out in an analogous manner to Example 92 except using Hf instead of Ti, thus obtaining a good quality diamond of IIa type substantially similar to that of Example 92.

Example 99

Synthesis of diamond crystal was carried out in an analogous manner to Example 92 except using an alloy of Fe:Ni:Co:C=60:30:10:4.2 (weight ratio) as a solvent metal, thus obtaining a good quality diamond of IIa type substantially similar to that of Example 92.

Example 100

Synthesis of diamond crystal was carried out in an analogous manner to Example 92 except using an alloy of Fe:Ni:Mn:C=60:30:10:4.0 (weight ratio) as a solvent metal, thus obtaining a good quality diamond of IIa type substantially similar to that of Example 92.

Example 101

Synthesis of diamond crystal was carried out in an analogous manner to Example 92 except using an alloy of Fe:Ni:C=70:30:3.5 (weight ratio) as a solvent metal, thus obtaining a good quality diamond of IIa type substantially similar to that of Example 92.

Example 102

Synthesis of diamond crystal was carried out in an analogous manner to Example 92 except using a Ti sheet with a thickness of 0.05 mm and a Zr sheet with a thickness of 0.05 mm, which were stacked, instead of the Ti sheet with a thickness of 0.1 mm, thus obtaining a good quality diamond of IIa type substantially similar to that of Example 92.

Example 103

When diamond was synthesized in an analogous manner to Example 92 except not disposing the Al sheet, consequently, diamond was hardly grown and a film of TiC was formed on the seed crystal.

Example 104

When diamond was synthesized in an analogous manner to Example 92 except not disposing the Ti sheet and changing the thickness of the Al sheet in 0.5 mm (5 volume %), consequently, a diamond crystal of about 0.8 carat was obtained, but colored lightly yellowish and contained more inclusion. The nitrogen concentration was 2 ppm and the amount of the inclusion was 3 weight %.

Example 105

When diamond was synthesized in an analogous manner to Example 92 except changing the thickness of the Al sheet in 0.5 mm (5 volume %), consequently, a diamond crystal of about 0.8 carat having less nitrogen content but containg more inclusion was obtained. The nitrogen concentration was at most 0.1 ppm, but the amount of the inclusion reached about 3 weight %.

Example 106

When diamond was synthesized in an analogous manner to Example 92 except changing the thickness of the Ti sheet in 1.0 mm (10 volume %), consequently, a diamond crystal of about 0.8 carat having less nitrogen content but containing more inclusion was obtained. The nitrogen concentration was at most 0.1 ppm, but the amount of the inclusion reached about 5 weight %.

Example 107

Synthesis of diamond crystal was carried out in an analogous manner to Example 92 except using, as a solvent, an alloy consisting of a composition of Fe:Ni:Co=60:30:10 by weight, and adding no carbon. Consequently, the seed crystals were completely dissolved in the solvent and disappeared. There was found no growth of diamond.

Example 108

Synthesis of diamond crystal was carried out in an analogous manner to Example 92 except using, as a solvent, an alloy consisting of a composition of Fe:Ni:Co=60:30:10 by weight. Consequently, a number of spontaneous nucleation of diamond took place from other sites than the seed crystals and the crystals interfered with each other, thus hardly obtaining a good quality crystal.

Example 109

In a construction of a sample chamber as shown in FIG. 11, diamond powder was used as a carbon source 1 and an alloy having a composition of Fe:Co:C=60:40:4.5 (by weight) in the form of a diameter of 20 mm and a thick of 10 mm was used as a solvent metal 2. As a nitrogen getter 3 at the solve metal side, there was used a Ti sheet having a diameter of 20 mm and a thick ness of 0.1 mm and as a low viscosity metal 4 at the seed crystall side, the was used an Sn sheet having a diameter of 20 mm and a thickness of 0.1 mm. During the same time, the amount of Ti was 1 volume % to the solvent and that of Sn was 1 volume % to the solvent. As a seed crystal 5, three diamond crystals each having about a diameter of 500 μA m were used. The sample chamber was set in a heater in such a manner that a temperature gradient of about 30 c was provided between the carbon source and seed crystal and maintained at a pressure of 5.5 GPa and a temperature of 1300° C. for 70 hours in an ultra-high pressure producing apparatus, thereby synthesizing diamond.

Consequently, three colorless and transparent, substantially inclusion-free, high quality Ia type diamond crystals of 0.7 to 0.9 carat were obtainec all of which had a nitrogen concentration of at most 0.1 ppm, measured by ESR, and an inclusion concentration of at most 0.3 weight %, measured by a magnetic balance.

Example 110

Synthesis of diamond crystal was carried out in an analogous manner to Example 109 except using a Zr sheet with a diameter of 20 mm and a thickness o0 0.1 mm (corresponding to 1 volume % to the solvent metal) as a nitrogen getter 3, thus obtaining a good quality diamond of hIa type substantially similar to that of Example 109.

Example 111

Synthesis of diamond crystal was carried out in an analogous manner to Example 109 except using a Hf sheet with a diameter of 20 mm and a thickness of 0.1 mm (corresponding to 1 volume % to the solvent metal) as a nitrogen getter 3, thus obtaining a good quality diamond of IIa type substantially similar to that of Example 109.

Example 112

Synthesis of diamond crystal was carried out in an analogous manner to Example 109 except using an Al sheet with a diameter of 20 mm and a thicknes of 0.8 mm (corresponding to 1 volume % to the solvent metal) as a nitrogen getter 3, thus obtaining a good quality diamond of IIa type substantially similar to that of Example 109.

Example 113

Synthesis of diamond crystal was carried out in an analogous manner to Example 109 except using, as a nitrogen getter 3, a Ti sheet with a diameter of 20 mm and a thickness of 0.1 mm (corresponding to 1 volume % to the solvent metal) and an Al sheet with a diameter of 20 mm and a thickness of 0.1 mm (corresponding to 1 volume % to the solvent metal), which were stacked in such a manner that the Ti sheet was contacted with the solvent side, thus obtaining a good quality diamond of IIa type subtantially similar to that of Example 109.

Example 114

Synthesis of diamond crystal was carried out in an analogous manner to Example 109 except using, as a nitrogen getter 3, a Zr sheet with a diameter of 20 mm and a thickness of 0.1 mm (corresponding to 1 volume % to the solvent metal) and an Al sheet with a diameter of 20 mm and a thickness of 0.1 mm (corresponding to 1 volume % to the solvent metal), which were stacked in such a manner that the Zr sheet was contacted with the solvent side, thus obtaining a good quality diamond of IIa type subtantially similar to that of Example 109.

Example 115

Synthesis of diamond crystal was carried out in an analogous manner to Example 109 except using, as a solvent, an alloy consisting of a composition of Fe:Ni:Co:C= 60:30:10:4.2 by weight, thus obtaining a good quality diamond of IIa type subtantially similar to that of Example 109.

Example 116

Synthesis of diamond crystal was carried out in an analogous manner to Example 109 except using, as a solvent, an alloy consisting of a composition of Fe:Ni:Mn:C= 60:30:10:4.0 by weight, thus obtaining a good quality diamond of IIa type subtantially similar to that of Example 109.

Example 117

Synthesis of diamond crystal was carried out in an analogous manner to Example 109 except using, as a solvent, an alloy consisting of a composition of Fe:Ni:C=70:30:3.5 by weight, thus obtaining a good quality diamond of IIa type subtantially similar to that of Example 109.

Example 118

Synthesis of diamond crystal was carried out in an analogous manner to Example 109 except using, as a solvent, an alloy consisting of a composition of Co:C=100:4.7 by weight and adjusting the synthetic temperature condition to 1350° C., thus obtaining a good quality diamond of IIa type subtantially similar to that of Example 109.

Example 119

Synthesis of diamond crystal was carried out in an analogous manner to Example 109 except using, as a solvent, an alloy consisting of a composition of Ni:C=100:4.2 by weight and adjusting the synthetic temperature condition to 1350° C., thus obtaining a good quality diamond of IIa type subtantially similar to that of Example 109.

Example 120

When diamond was synthesized in an analogous manner to Example 109 except not disposing the Sn sheet, consequently, diamond was hardly grown and a TiC film was formed on the surface of the seed crystal.

Example 121

When diamond was synthesized in an analogous manner to Example 109 except not disposing the Sn sheet and using an Al sheet with a diameter of 20 mm and thickness of 0.8 mm (corresponding to 8 volume % to the solvent metal), a colorless and transparent crystal of about 0.8 carat was obtained having a large inclusion content, i.e. 3 weight %.

Example 122

When diamond was synthesized in an analogous manner to Example 109 except not disposing the nitrogen getter 3, consequently, there was obtained a crystal of Ib type with 0.8 carat, which was substantially free from inclusion (at most 0.3 weight %), contained about 80 ppm of nitrogen in substitutional type and colored yellow.

Example 123

When diamond was synthesized in an analogous manner to Example 109 except changing the thickness of the Sn sheet in 0.7 mm (7 volume % to the solvent metal), consequently, a good quality single crystal could not be obtained because of rendering polycrystalline and a number of spontaneous nucleations took place from other sites than the seed crystals.

Example 124

When diamond was synthesized in an analogous manner to Example 109 except changing the thickness of the Ti sheet in 1.2 mm (12 volume % to the solvent metal) but maintaining the diameter thereof as it was, consequently, there was obtained a crystal of about 0.8 carat with less nitrogen content but more inclusion. The nitrogen concentration was at most 0.1 ppm, but the inclusion content reached about 5 weight %.

Example 125

Synthesis of diamond crystal was carried out in an analogous manner to Example 109 except using, as a solvent, an alloy consisting of a composition of Fe:Ni:Co=60:30:10 by weight, and adding no carbon (C). Consequent the seed crystals were completely dissolved in the solvent and disappeared. There was found no growth of diamond.

Example 126

Synthesis of diamond crystal was carried out in an analogous manner to Example 109 except using, as a solvent, an alloy consisting of a composition of Fe:Ni:Co:C=60:30:10:7 by weight. Consequently, a number of spontaneous nucleation of diamond took place from other sites than the seed crystals and the crystals interfered with each other, thus hardly obtaining a good quality crystal.

Utility and Possibility on Commercial Scale

As explained above, according to the present invention, a colorless and transparent, substantially inclusion-free crystal can be synthesized in stable and economical manner.

The diamond single crystal synthesized by the present invention can be applied to decorative uses and optical parts, in particular, as infrared optical parts, to diamond anvils for infrared spectrometer, ultra-high pressure diamond anvils, prisms for ATR, window materials for infrared spectrometer, window materials for laser beam, etc.

What is claimed is:

1. In a process for synthesis of colorless and transparent diamond single crystals containing metal in an amount of at most 0.5 weight %, N in an amount of at most 0.1 ppm and B in an amount of 0.1 to 0.6 ppm by the temperature gradient method which employs diamond as a carbon source, a solvent metal and a seed crystal, wherein the carbon source is separated from the seed crystal by a solvent metal, wherein said carbon source dissolves in said solvent metal upon heating, a temperature gradient exists between the carbon source and seed crystal and temperature and pressure are such as to permit diamond crystal growth on said seed crystal, the improvement consisting essentially of:

(a) a solvent for crystal growth of an alloy containing Fe and at least one member selected from the group consisting of Co, Ni, Mn and Cr, said solvent further containing 0.1 to 6 wt. % carbon;

(b) a nitrogen getter for removing nitrogen in the solvent of at least one metal selected from the group consisting of Ti, Zr, Hf, V, Nb and Ta, in a proportion of from 0.5 to 7% by weight based on the solvent;

(c) a low viscosity element which is at least one member selected from the group consisting of Al, Sn, In, Ga, Ag, Cu, Cs, Pb, Sb and Zn, in an amount of from 0.5 to 3% by weight based on the solvent and (d) the crystal growth rate being higher than 2 mg/hr.

2. The process for the synthesis of diamond as claimed in claim 1, wherein the addition of the low viscosity element is carried out by stacking a metal sheet consisting of said nitrogen getter metal selected from the group consisting of Ti, Zr, Hf, V, Nb and Ta and a metal sheet consisting of the low viscosity element between the solvent and seed crystal.

3. The process for the synthesis of diamond as claimed in claim 1, wherein the addition of the low viscosity element is carried out by using an intermetallic compound thereof with said nitrogen getter.

4. The process for the synthesis of diamond as claimed in claim 1 wherein the addition of the low viscosity element is carried out by adding an alloy thereof with said nitrogen getter or solvent in the form of a powder with a diameter of 10 μm to 1 mm or fragments of 0.2 to 5 volume % of the solvent to the solvent.

5. In a process for the synthesis of diamond single crystals containing metal in an amount of at most 0.5 weight % by the temperature gradient method which employs a carbon source, a solvent metal and a seed crystal, wherein the carbon source is separated from the seed crystal by a solvent metal, wherein said carbon source dissolves in said solvent metal upon heating, a temperature gradient exists between the carbon source and seed crystal and temperature and pressure are such as to permit diamond crystal growth on said seed crystal, the improvement which comprises contacting said solvent metal of at least one member selected from the group consisting of Fe, Co, Ni, Mn and Cr with said carbon source, arranging at least one metal selected from the group consisting of Ti, Zr and Hf as a nitrogen getter at the solvent metal side between the solvent metal and said seed crystal disposed below the solvent metal and arranging Al at the seed crystal side between the nitrogen getter and the seed crystal in such a manner that the seed crystal is not contacted with the nitrogen getter.

6. The method according to claim 5, wherein the temperature difference between the carbon source and the seed crystal is 20 to 30° C., the pressure is 5.3 to 5.6 GPa, and the temperature is 1250 to 1410° C.

7. The process for the synthesis of diamond crystal as claimed in claim 5, wherein the solvent metal contains at least one member selected from the group consisting of Fe, Co, Ni, Mn and Cr, and 0.1 to 6 weight % of carbon.

8. The process for the synthesis of diamond crystal as claimed in claim 5, wherein the amount of at least one metal selected from the group consisting of Ti, Zr and Hf as a nitrogen getter is 0.2 to 5 volume % based on the solvent metal and the amount of Al is 0.1 to 2 volume % based on the solvent metal.

9. In a process for the synthesis of diamond single crystals containing metal in an amount of at most 0.5 weight % by the temperature gradient method which employs a carbon source, a solvent metal and a seed crystal, wherein the carbon source is separated from the seed crystal by a solvent metal, wherein said carbon source dissolves in said solvent metal upon heating, a temperature gradient exists between the carbon source and seed crystal and temperature and pressure are such as to permit diamond crystal growth on said seed crystal, the improvement which comprises contacting said solvent metal of at least one member selected from the group consisting of Fe, Co, Ni, Mn and Cr with said carbon source, arranging at least one metal selected from the group consisting of Al, Ti, Zr and Hf as a nitrogen getter at the solvent metal side between the solvent metal and said seed crystal disposed below the solvent metal and arranging Sn at the seed crystal side between the nitrogen getter and the seed crystal in such a manner that the seed crystal is not contacted with the nitrogen getter.

10. The method according to claim 9, wherein the temperature difference between the carbon source and the seed crystal is 20 to 30° C., the pressure is 5.3 to 5.6 GPa, and the temperature is 1250 to 1410° C.

11. The process for the synthesis of diamond crystal as claimed in claim 9, wherein the solvent metal contains at least one member selected from the group consisting of Fe, Co, Ni, Mn and Cr, and 0.1 to 6 weight % of carbon.

12. The process for the synthesis of diamond crystal as claimed in claim 9, wherein the amount of at least one metal selected from the group consisting of Al, Ti, Zr and Hf as a nitrogen getter is 0.2 to 10 volume % based on the solvent metal and the amount of Sn is 0.1 to 5 volume % based on the solvent metal.

* * * * *